US012065456B2

(12) United States Patent
Raines et al.

(10) Patent No.: US 12,065,456 B2
(45) Date of Patent: Aug. 20, 2024

(54) BORON-CONTAINING PHARMACOPHORE

(71) Applicant: MASSACHUSETTS INSTITUTE OF TECHNOLOGY, Cambridge, MA (US)

(72) Inventors: Ronald T. Raines, Cambridge, MA (US); Ian William Windsor, Cambridge, MA (US); Brian James Graham, Belmont, MA (US)

(73) Assignee: NATIONAL INSTITUTES OF HEALTH (NIH), U.S. DEPT. OF HEALTH AND HUMAN SERVICES (DHHS), U.S. GOVERNMENT, Bethesda, MD (US)

( * ) Notice: Subject to any disclaimer, the term of this patent is extended or adjusted under 35 U.S.C. 154(b) by 0 days.

(21) Appl. No.: 16/881,272

(22) Filed: May 22, 2020

(65) Prior Publication Data
US 2021/0024548 A1    Jan. 28, 2021

Related U.S. Application Data

(60) Provisional application No. 62/878,560, filed on Jul. 25, 2019.

(51) Int. Cl.
*C07F 5/02* (2006.01)
(52) U.S. Cl.
CPC .................................. *C07F 5/025* (2013.01)
(58) Field of Classification Search
CPC ........................................................ C07F 5/025
See application file for complete search history.

(56) References Cited

U.S. PATENT DOCUMENTS

| | | | |
|---|---|---|---|
| 5,880,188 | A | 3/1999 | Austin et al. |
| 8,343,944 | B2 | 1/2013 | Xia et al. |
| 8,669,207 | B1 | 3/2014 | Martin et al. |

FOREIGN PATENT DOCUMENTS

EP    2343304 A1 *  7/2011    ............. A61P 33/02

OTHER PUBLICATIONS

Catlin et al. ("Preparation and Reactions of o-(Cyanomethyl)benzeneboronic Acid", The Journal of Organic Chemistry, Jun. 1969, vol. 34, No. 6, pp. 1660-1663). (Year: 1969).*
Lennarz et al. ("Arylboronic Acids. IV. Reactions of Boronophthalide", May 1960, Journal of the American Chemical Society, vol. 82, Issue 9, pp. 2172-2175). (Year: 1960).*
Li et al. ("Synthesis of new acylsulfamoyl benzoxaboroles as potent inhibitors of HCV NS3 protease", Bioorganic & Medicinal Chemistry Letters, Oct. 2010, vol. 20, pp. 7493-7497). (Year: 2010).*
Windsor ("HIV-1 Protease as a Target for Antiretroviral Therapy", doctoral thesis, Mar. 2019, Massachusetts Institute of Technology, 424 pages). (Year: 2019).*
Dowlut et al, An improved class of sugar-binding boronic acids, soluble and capable of complexing glycosides in neutral water, Journal of American Chemical Society, vol. 128, pp. 4226-4227, 2006.
Windsor, HIV-1 Protease as a Target for Antiretroviral Therapy, A thesis submitted to the Department of Chemistry, Massachusetts Institute of Technology, in partial fulfillment of the requirements for the degree of Doctor of Philosophy in Chemistry, pp. 1-424, Feb. 2019.
National Center for Biotechnology Information. "PubChem Compound Summary for CID 130120862" PubChem, https://pubchem.ncbi.nlm.nih.gov/compound/130120862. Accessed Jul. 19, 2021.
International Search Report for PCT/US2020/034242, dated Oct. 1, 2020, 4 pages.

* cited by examiner

*Primary Examiner* — Rosalynd A Keys
(74) *Attorney, Agent, or Firm* — Brian C. Trinque; Nicole Sassu; Lathrop GPM LLP

(57) ABSTRACT

Provided herein are boron-containing compounds, pharmaceutical compositions comprising such compounds, and methods of using such compounds to treat diseases or disorders.

4 Claims, 3 Drawing Sheets

BORON-CONTAINING PHARMACOPHORE

RELATED APPLICATIONS

The present application claims priority to U.S. Provisional Application No. 62/878,560, filed Jul. 25, 2019, the entire content of which is incorporated herein by reference.

STATEMENT REGARDING FEDERALLY SPONSORED RESEARCH OR DEVELOPMENT

This invention was made with Government support under Grant No. R01 GM044783 awarded by the National Institutes of Health (NIH). The Government has certain rights in the invention.

BACKGROUND

The utility of Suzuki-Miyaura coupling has made boronic acids common reagents in synthetic organic chemistry. The electronic properties of boronic acids also impart a unique ability to bind covalently, yet reversibly, to proteins and carbohydrates. This attribute has found widespread application in chemical biology, medicinal chemistry, and materials chemistry.

Despite its beneficial attributes, very few commercial drugs contain boron. The clinical implementation of boron began with the proteasome inhibitor bortezomib, which contains an alkylboronic acid. Arylboronic acids are more stable than alkylboronic acids, and can likewise form cyclic esters with 1,2- and 1,3-diols. In 2006, Hall reported that benzoxaborole, which is the cyclic ester of 2-(hydroxymethyl)phenylboronic acid (2-HMPBA), forms more stable esters than does phenylboronic acid (PBA) (Dowlut, M.; Hall, D. G. *J. Am. Chem. Soc.* 2006, 128, 4226-4227). Subsequently, ixazomib was approved for the treatment of multiple myeloma, and two benzoxaboroles, tavaborole and crisaborole, were approved for the treatment of fungal infections and dermatitis, respectively.

The sparsity of boronic acids in the clinic might be attributable to their having poor metabolic stability. In aqueous solutions, boronic acids degrade by two major pathways: (1) protodeboronation, in which a C—B bond is replaced with a C—H bond, and (2) oxidative deboronation, in which a C—B bond is replaced with a C—O bond. Protodeboronation generally requires an extreme pH, high temperature, or a metal catalyst, conditions that are not relevant physiologically. In contrast, the primary metabolite of boronic acids in vivo is the oxidative deboronation product, an alcohol, with reactivity that can be replicated in vitro by using reactive oxygen species or P450 enzymes.

Therefore, there remains a need for metabolically stable boron-containing compounds that can be used as therapeutics.

SUMMARY

In an aspect, provided herein is a compound of Formula I:

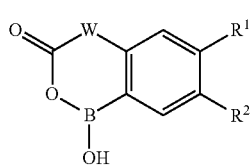

(I)

or a pharmaceutically acceptable salt thereof;
wherein
B is boron;
W is absent or $C(R^3)_2$;
$R^1$ is selected from the group consisting of H, halo, $-NH_2$, $NH(C_1-C_6$ alkyl), $N(C_1-C_6$ alkyl$)_2$, $-OH$, $-SH$, $C_1-C_6$ alkyl, $C_1-C_6$ alkoxy, $-SO_3H$, and $-SO_2NH_2$;
$R^2$ is selected from the group consisting of H, halo, $-NH_2$, $NH(C_1-C_6$ alkyl), $N(C_1-C_6$ alkyl$)_2$, $-OH$, $-SH$, $C_1-C_6$ alkyl, $C_1-C_6$ alkoxy, $-SO_3H$, and $-SO_2NH_2$; and
$R^3$ is independently, at each occurrence, selected from the group consisting of H, halo, $C_1-C_6$ alkyl, $C_1-C_6$ alkoxy, $C_6-C_{10}$ aryl, $C_5-C_{10}$ heteroaryl, $C_3-C_{10}$ cycloalkyl, and $C_3-C_{10}$ heterocycloalkyl.

In another aspect, provided herein is a compound of Formula II:

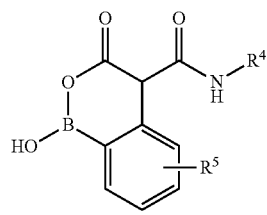

(II)

or a pharmaceutically acceptable salt thereof;
wherein
B is boron;
$R^4$ is selected from the group consisting of $C_6-C_{10}$ aryl, $C_5-C_{10}$ heteroaryl, $C_3-C_{10}$ cycloalkyl, and $C_3-C_{10}$ heterocycloalkyl, wherein $C_5-C_{10}$ heteroaryl is optionally substituted with methyl; and
$R^5$ is selected from the group consisting of H, halo, $-NH_2$, $NH(C_1-C_6$ alkyl), $N(C_1-C_6$ alkyl$)_2$, $-OH$, $-SH$, $C_1-C_6$ alkyl, $C_1-C_6$ alkoxy, $-SO_3H$, and $-SO_2NH_2$.

In yet another aspect, provided herein is a compound of Formula III:

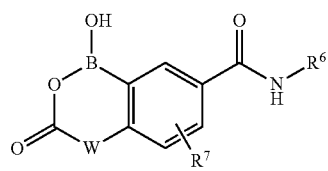

(III)

or a pharmaceutically acceptable salt thereof;
wherein
B is boron;
W is absent or $C(R^8)_2$;
$R^6$ is selected from the group consisting of $C_6-C_{10}$ aryl, $C_5-C_{10}$ heteroaryl, $C_3-C_{10}$ cycloalkyl, and $C_3-C_{10}$ heterocycloalkyl, wherein $C_5-C_{10}$ heteroaryl is optionally substituted with methyl;
$R^7$ is selected from the group consisting of H, halo, $-NH_2$, $NH(C_1-C_6$ alkyl), $N(C_1-C_6$ alkyl$)_2$, $-OH$, $-SH$, $C_1-C_6$ alkyl, $C_1-C_6$ alkoxy, $-SO_3H$, and $-SO_2NH_2$; and $R^8$ is independently, at each occurrence, selected from the group consisting of H, halo, $C_1$-$C_6$ alkyl, $C_1$-$C_6$ alkoxy, $C_6$-$C_{10}$ aryl, $C_5$-$C_{10}$ heteroaryl, $C_3$-$C_{10}$ cycloalkyl, and $C_3$-$C_{10}$ heterocycloalkyl.

In still another aspect, provided herein is a compound of Formula IV:

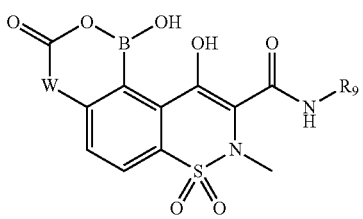

(IV)

or a pharmaceutically acceptable salt or tautomer thereof; wherein

B is boron;

W is absent or $C(R^{10})_2$;

$R^9$ is selected from the group consisting of $C_6$-$C_{10}$ aryl, $C_5$-$C_{10}$ heteroaryl, $C_3$-$C_{10}$ cycloalkyl, and $C_3$-$C_{10}$ heterocycloalkyl, wherein $C_5$-$C_{10}$ heteroaryl is optionally substituted with methyl; and $R^{19}$ is independently, at each occurrence, selected from the group consisting of H, halo, $C_1$-$C_6$ alkyl, $C_1$-$C_6$ alkoxy, $C_6$-$C_{10}$ aryl, $C_5$-$C_{10}$ heteroaryl, $C_3$-$C_{10}$ cycloalkyl, and $C_3$-$C_{10}$ heterocycloalkyl.

In an aspect, provided herein is a compound of Formula V:

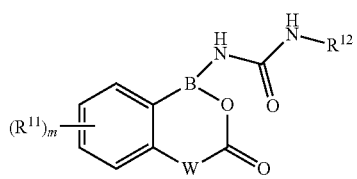

(V)

or a pharmaceutically acceptable salt thereof; wherein

B is boron;

W is absent or $C(R^{13})_2$;

$R^{11}$ is selected from the group consisting of H, halo, $C_1$-$C_6$ alkyl, —$NH_2$, $C(O)CH_3$, and $C_1$-$C_6$ alkyl-$R^{14}$;

$R^{12}$ is selected from the group consisting of $C_1$-$C_6$ alkyl, $C_6$-$C_{10}$ cycloalkyl, and $C_5$-$C_8$ heterocycloalkyl, wherein $C_6$-$C_{10}$ cycloalkyl is optionally substituted with methyl or —OH;

$R^{13}$ is independently, at each occurrence, selected from the group consisting of H, halo, $C_1$-$C_6$ alkyl, $C_1$-$C_6$ alkoxy, $C_6$-$C_{10}$ aryl, $C_5$-$C_{10}$ heteroaryl, $C_3$-$C_{10}$ cycloalkyl, and $C_3$-$C_{10}$ heterocycloalkyl; and $R^{14}$ is selected from the group consisting of

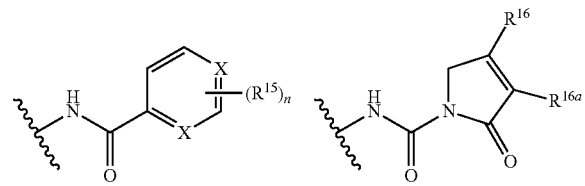

-continued

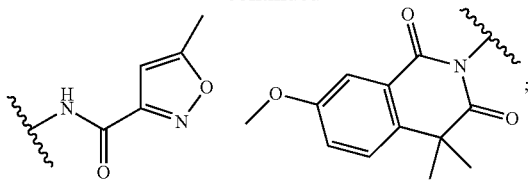

X is independently, at each occurrence, N, CH, or $CR^{19}$;

$R^{15}$ is independently, at each occurrence, selected from the group consisting of halo, $C_4$ alkyl, and $C_1$-$C_4$ alkoxy;

$R^{19}$ is independently, at each occurrence, selected from the group consisting of halo, $C_4$ alkyl, and $C_1$-$C_4$ alkoxy;

$R^{16}$ and $R^{16a}$ are each, independently, $C_1$-$C_4$ alkyl;

m is 0, 1, or 2; and n is 0, 1, or 2.

In another aspect, provided herein is a compound selected from the group consisting of

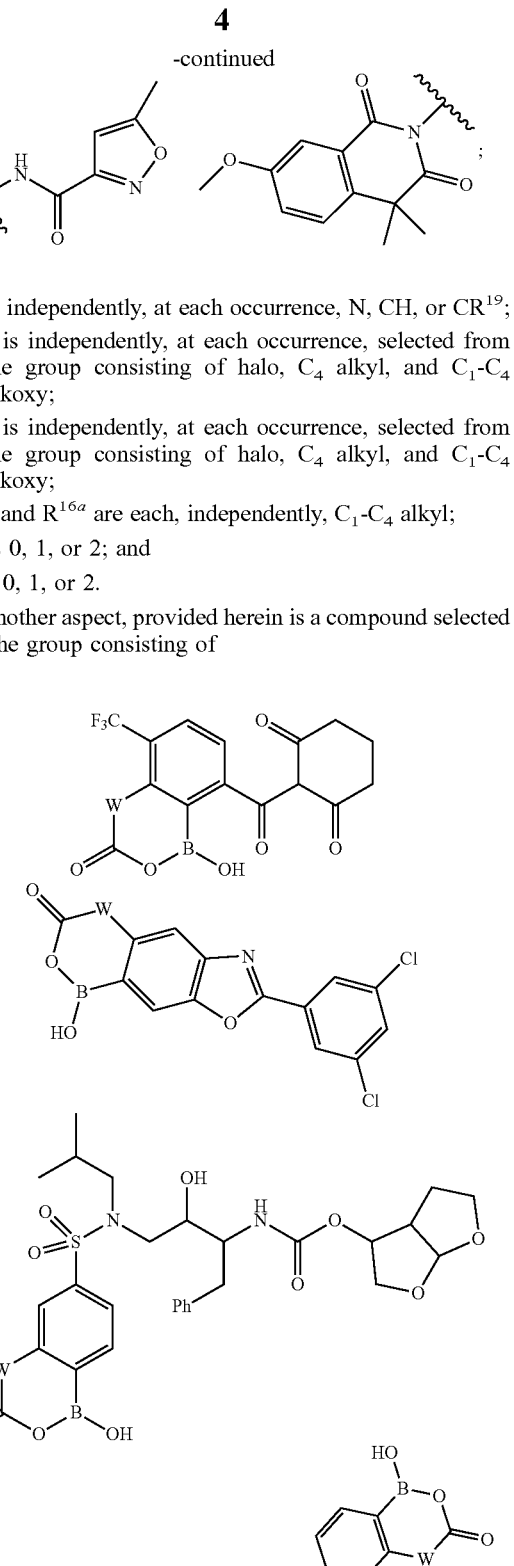

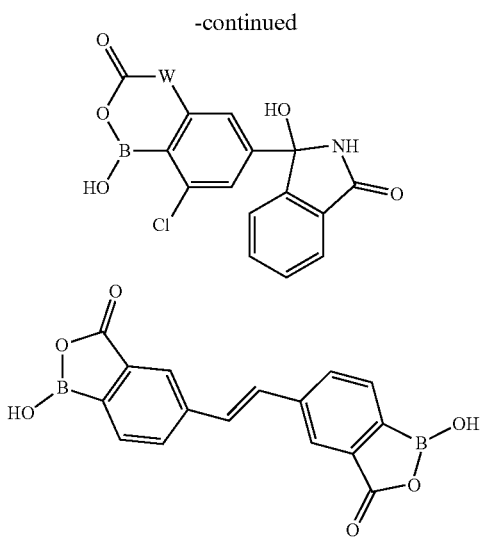

or a pharmaceutically acceptable salt thereof;
wherein
W is absent or $C(R^{17})_2$; and
$R^{17}$ is independently, at each occurrence, selected from the group consisting of H, halo, $C_1$-$C_6$ alkyl, $C_1$-$C_6$ alkoxy, $C_6$-$C_{10}$ aryl, $C_5$-$C_{10}$ heteroaryl, $C_3$-$C_{10}$ cycloalkyl, and $C_3$-$C_{10}$ heterocycloalkyl.

In yet another aspect, provided herein is a method of treating an infection in an individual in need thereof, comprising administering to the individual a therapeutically effective amount of a compound disclosed herein.

In still another aspect, provided herein is a method of treating dermatitis in an individual in need thereof, comprising administering to the individual a therapeutically effective amount of a compound disclosed herein.

In an aspect, provided herein is a method of treating an inflammatory-related disease in an individual in need thereof, comprising administering to the individual a therapeutically effective amount of a compound disclosed herein.

In another aspect, provided herein is a method of treating high blood pressure disease in an individual in need thereof, comprising administering to the individual a therapeutically effective amount of a compound disclosed herein.

In still another aspect, provided herein is a method of treating cancer in an individual in need thereof, comprising administering to the individual a therapeutically effective amount of a compound disclosed herein.

In an aspect, provided herein is a method of inhibiting an enzyme in an individual in need thereof, comprising administering to the individual a therapeutically effective amount of a compound disclosed herein.

DETAILED DESCRIPTION

Figure 1:
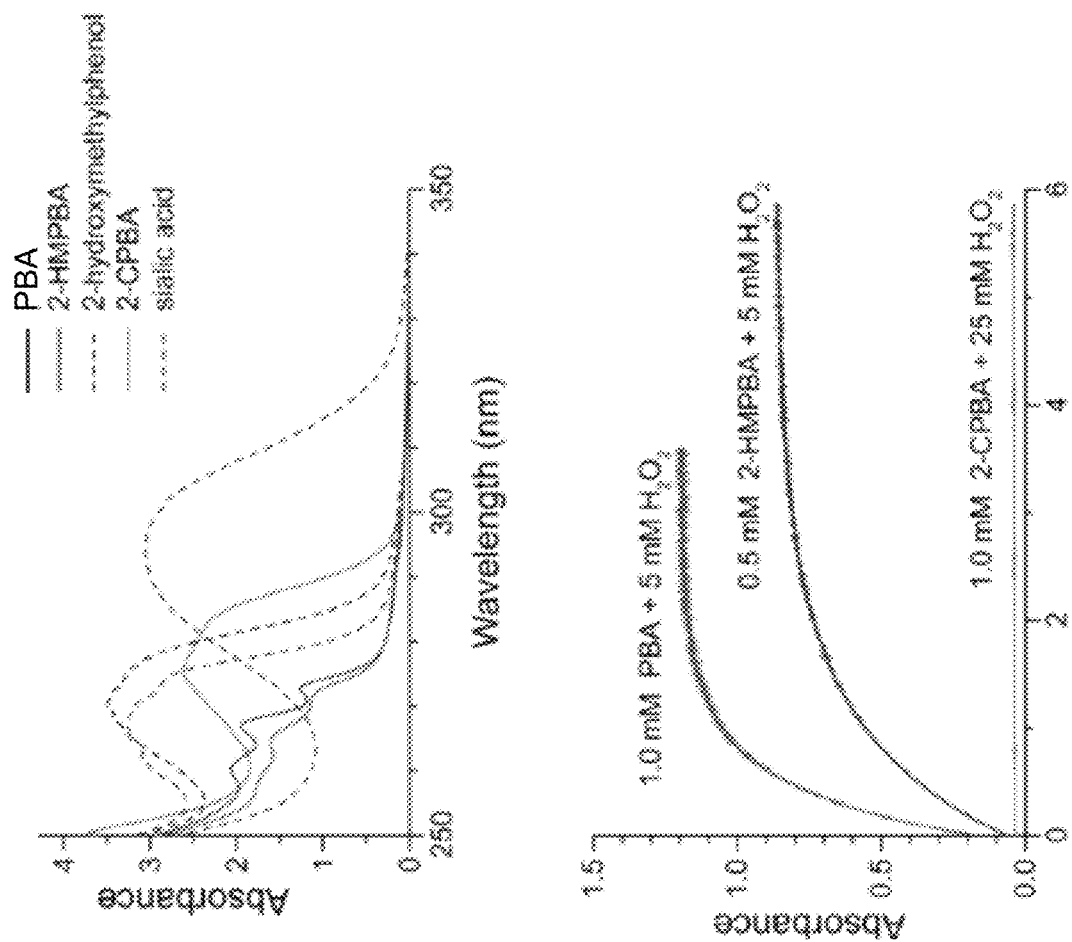
FIG. 1 shows UV spectra used as the basis for assays of oxidation of the boronic acids. Top: UV spectrum of phenylboronic acid (PBA), (2-hydroxymethyl)phenylboronic acid (2-HMPBA), and 2-carboxyphenylboronic acid (2-CPBA) and their phenolic oxidation products. Bottom: Representative raw data showing the change in absorbance upon oxidation in PBS buffer.

Provided herein are borolone compounds, or pharmaceutically acceptable salts thereof, that exhibit superior metabolic stability over their boronic acid and borole counterparts. The metabolic stability of the compounds provided herein is evidenced by comparative studies using phenylboronic acid (PBA) and (2-hydroxymethyl)-phenylboronic acid (2-HMPBA), and 2-carboxyphenylboronic acid (2-CPBA).

Definitions

Listed below are definitions of various terms used to describe the compounds provided herein. These definitions apply to the terms as they are used throughout this specification and claims, unless otherwise limited in specific instances, either individually or as part of a larger group.

Unless defined otherwise, all technical and scientific terms used herein generally have the same meaning as commonly understood by one of ordinary skill in the art. Generally, the nomenclature used herein and the laboratory procedures in cell culture, molecular genetics, organic chemistry, and peptide chemistry are those well-known and commonly employed in the art.

As used herein, the articles "a" and "an" refer to one or to more than one (i.e., to at least one) of the grammatical object of the article. By way of example, "an element" means one element or more than one element. Furthermore, use of the term "including" as well as other forms, such as "include," "includes," and "included," is not limiting.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, including ±5%, ±1%, and ±0.1% from the specified value, as such variations are appropriate to perform the disclosed methods.

The term "treat," "treated," "treating," or "treatment" includes the diminishment or alleviation of at least one symptom associated or caused by the state, disorder or disease being treated.

As used herein, the term "prevent" or "prevention" means no disorder or disease development if none had occurred, or no further disorder or disease development if there had already been development of the disorder or disease. Also considered is the ability of one to prevent some or all of the symptoms associated with the disorder or disease.

As used herein, the term "patient," "individual," or "subject" refers to a human or a non-human mammal. Non-human mammals include, for example, livestock and pets, such as ovine, bovine, porcine, canine, feline and marine mammals. Preferably, the patient, subject, or individual is human.

As used herein, the terms "effective amount," "pharmaceutically effective amount," and "therapeutically effective amount" refer to a nontoxic but sufficient amount of an agent to provide the desired biological result. That result may be reduction or alleviation of the signs, symptoms, or causes of a disease, or any other desired alteration of a biological system. An appropriate therapeutic amount in any individual case may be determined by one of ordinary skill in the art using routine experimentation.

As used herein, the term "pharmaceutically acceptable" refers to a material, such as a carrier or diluent, which does not abrogate the biological activity or properties of the compound, and is relatively non-toxic, i.e., the material may be administered to an individual without causing undesirable biological effects or interacting in a deleterious manner with any of the components of the composition in which it is contained.

As used herein, the term "pharmaceutically acceptable salt" refers to derivatives of the disclosed compounds wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts of the compounds provided herein include the conventional non-toxic salts of the parent compound formed, for example, from non-toxic inorganic or organic acids. The pharmaceutically acceptable salts of the compounds provided herein can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile are preferred. The phrase "pharmaceutically acceptable salt" is not limited to a mono, or 1:1, salt. For example, "pharmaceutically acceptable salt" also includes bis-salts, such as a bis-hydrochloride salt. Lists of suitable salts are found in Remington's Pharmaceutical Sciences, 17th ed., Mack Publishing Company, Easton, Pa., 1985, p. 1418 and Journal of Pharmaceutical Science, 66, 2 (1977), each of which is incorporated herein by reference in its entirety.

As used herein, the term "composition" or "pharmaceutical composition" refers to a mixture of at least one compound provided herein with a pharmaceutically acceptable carrier. The pharmaceutical composition facilitates administration of the compound to a patient or subject. Multiple techniques of administering a compound exist in the art including, but not limited to, intravenous, oral, aerosol, parenteral, ophthalmic, pulmonary, and topical administration.

As used herein, the term "pharmaceutically acceptable carrier" means a pharmaceutically acceptable material, composition or carrier, such as a liquid or solid filler, stabilizer, dispersing agent, suspending agent, diluent, excipient, thickening agent, solvent or encapsulating material, involved in carrying or transporting a provided herein within or to the patient such that it may perform its intended function. Typically, such constructs are carried or transported from one organ, or portion of the body, to another organ, or portion of the body. Each carrier must be "acceptable" in the sense of being compatible with the other ingredients of the formulation, including the compound provided herein, and not injurious to the patient. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; surface active agents; alginic acid; pyrogen-free water; isotonic saline; Ringer's solution; ethyl alcohol; phosphate buffer solutions; and other non-toxic compatible substances employed in pharmaceutical formulations.

As used herein, "pharmaceutically acceptable carrier" also includes any and all coatings, antibacterial and antifungal agents, and absorption delaying agents, and the like that are compatible with the activity of the compound provided herein, and are physiologically acceptable to the patient. Supplementary active compounds may also be incorporated into the compositions. The "pharmaceutically acceptable carrier" may further include a pharmaceutically acceptable salt of a compound provided herein. Other additional ingredients that may be included in the pharmaceutical compositions provided herein are known in the art and described, for example, in Remington's Pharmaceutical Sciences (Genaro, Ed., Mack Publishing Co., 1985, Easton, PA), which is incorporated herein by reference.

As used herein, the term "alkyl," by itself or as part of another substituent means, unless otherwise stated, a straight or branched chain hydrocarbon having the number of carbon atoms designated (i.e., $C_1$-$C_6$-alkyl means an alkyl having one to six carbon atoms) and includes straight and branched chains. In an embodiment, $C_1$-$C_6$alkyl groups are provided herein. Examples include methyl, ethyl, propyl, isopropyl, butyl, isobutyl, tert-butyl, pentyl, neopentyl, and hexyl. Other examples of $C_1$-$C_6$-alkyl include ethyl, methyl, isopropyl, isobutyl, n-pentyl, and n-hexyl.

As used herein, the term "alkynyl," by itself or as part of another substituent means, unless otherwise stated, an alkyl as defined above consisting of at least two carbon atoms and at least one carbon-carbon triple bond.

As used herein, the term "alkoxy," refers to the group —O-alkyl, wherein alkyl is as defined herein. Alkoxy includes, by way of example, methoxy, ethoxy, n-propoxy, isopropoxy, n-butoxy, sec-butoxy, t-butoxy and the like. In an embodiment, $C_1$-$C_6$ alkoxy groups are provided herein.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "cycloalkyl" means a non-aromatic carbocyclic system that is partially or fully saturated having 1, 2, or 3 rings wherein such rings may be fused. The term "fused" means that a second ring is present (i.e., attached or formed) by having two adjacent atoms in common (i.e., shared) with the first ring. Cycloalkyl also includes bicyclic structures that may be bridged or spirocyclic in nature with each individual ring within the bicycle varying from 3-8 atoms. The term "cycloalkyl" includes, but is not limited to, cyclopropyl, cyclobutyl, cyclopentyl, cyclohexyl, bicyclo[3.1.0]hexyl, spiro[3.3]heptanyl, and bicyclo[1.1.1]pentyl. In an embodiment, $C_4$-$C_7$ cycloalkyl groups are provided herein.

As used herein, the term "heterocycloalkyl" means a non-aromatic carbocyclic system containing 1, 2, 3, or 4 heteroatoms selected independently from N, O, and S and having 1, 2, or 3 rings wherein such rings may be fused, wherein fused is defined above. Heterocycloalkyl also includes bicyclic structures that may be bridged or spirocyclic in nature with each individual ring within the bicycle varying from 3-8 atoms, and containing 0, 1, or 2 N, O, or S atoms. The term "heterocycloalkyl" includes cyclic esters (i.e., lactones) and cyclic amides (i.e., lactams) and also specifically includes, but is not limited to, epoxidyl, oxetanyl, tetrahydrofuranyl, tetrahydropyranyl oxanyl), pyranyl, dioxanyl, aziridinyl, azetidinyl, pyrrolidinyl, 2,5-dihydro-1H-pyrrolyl, oxazolidinyl, thiazolidinyl, piperidinyl, morpholinyl, piperazinyl, thiomorpholinyl, 1,3-oxazinanyl, 1,3-thiazinanyl, 2-azabicyclo[2.1.1]hexanyl, 5-azabicyclo[2.1.1]hexanyl, 6-azabicyclo[3.1.1]heptanyl, 2-azabicyclo[2.2.1]heptanyl, 3-azabicyclo[3.1.1]heptanyl, 2-azabicyclo-[3.1.1]heptanyl, 3-azabicyclo[3.1.0]hexanyl, 2-azabicyclo[3.1.0]hexanyl, 3-azabicyclo-[3.2.1]octanyl, 8-azabicyclo[3.2.1]octanyl, 3-oxa-7-azabicyclo[3.3.1]nonanyl, 3-oxa-9-azabicyclo[3.3.1]nonanyl, 2-oxa-5-azabicyclo[2.2.1]heptanyl, 6-oxa-3-azabicyclo-[3.1.1]heptanyl, 2-azaspiro[3.3]heptanyl, 2-oxa-6-azaspiro[3.3]heptanyl, 2-oxaspiro-[3.3]heptanyl, 2-oxaspiro[3.5]nonanyl, 3-oxaspiro[5.3]nonanyl, and 8-oxabicyclo-[3.2.1]octanyl. In an embodiment, $C_3$-$C_{10}$ heterocycloalkyl groups are provided herein wherein $C_3$-$C_{10}$ is indicative of the number of atoms (3-10 carbon atoms and heteroatoms) in the heterocyclic ring.

As used herein, the term "aromatic" refers to a carbocycle or heterocycle with one or more polyunsaturated rings and having aromatic character, i.e., having (4n+2) delocalized π (pi) electrons, where n is an integer.

As used herein, the term "aryl" means an aromatic carbocyclic system containing 1, 2, or 3 rings, wherein such rings may be fused, wherein fused is defined above. If the rings are fused, one of the rings must be fully unsaturated and the fused ring(s) may be fully saturated, partially unsaturated or fully unsaturated. The term "aryl" includes, but is not limited to, phenyl, naphthyl, indanyl, and 1,2,3,4-tetrahydronaphthalenyl. In some embodiments, aryl groups have 6 carbon atoms. In some embodiments, aryl groups have from six to ten carbon atoms. In some embodiments, aryl groups have from six to sixteen carbon atoms. In an embodiment, $C_5$-$C_7$ aryl groups are provided herein.

As used herein, the term "heteroaryl" means an aromatic carbocyclic system containing 1, 2, 3, or 4 heteroatoms selected independently from N, O, and S and having 1, 2, or 3 rings wherein such rings may be fused, wherein fused is defined above. The term "heteroaryl" includes, but is not limited to, furanyl, thiophenyl, oxazolyl, thiazolyl, imidazolyl, pyrazolyl, triazolyl, tetrazolyl, isoxazolyl, isothiazolyl, oxadiazolyl, thiadiazolyl, pyridinyl, pyridazinyl, pyrimidinyl, pyrazinyl, imidazo[1,2-a]pyridinyl, pyrazolo[1,5-a]pyridinyl, 5,6,7,8-tetrahydroisoquinolinyl, 5,6,7,8-tetrahydroquinolinyl, 6,7-dihydro-5H-cyclopenta[b]pyridinyl, 6,7-dihydro-5H-cyclopenta[c]pyridinyl, 1,4,5,6-tetrahydrocyclopenta[c]pyrazolyl, 2,4,5,6-tetrahydrocyclopenta[c]pyrazolyl, 5,6-dihydro-4H-pyrrolo[1,2-b]pyrazolyl, 6,7-dihydro-5H-pyrrolo[1,2-b][1,2,4]triazolyl, 5,6,7,8-tetrahydro-[1,2,4]triazolo[1,5-a]pyridinyl, 4,5,6,7-tetrahydropyrazolo[1,5-a]pyridinyl, 4,5,6,7-tetrahydro-1H-indazolyl and 4,5,6,7-tetrahydro-2H-indazolyl. In an embodiment, $C_5$-$C_{10}$ heteroaryl groups are provided wherein $C_5$-$C_{10}$ is indicative of the number of atoms (5-10 carbon atoms and heteroatoms) in the heteroaryl ring.

It is to be understood that if an aryl, heteroaryl, cycloalkyl, or heterocycloalkyl moiety may be bonded or otherwise attached to a designated moiety through differing ring atoms (i.e., shown or described without denotation of a specific point of attachment), then all possible points are intended, whether through a carbon atom or, for example, a trivalent nitrogen atom. For example, the term "pyridinyl" means 2-, 3- or 4-pyridinyl, the term "thienyl" means 2- or 3-thioenyl, and so forth.

As used herein, the term "substituted" means that an atom or group of atoms has replaced hydrogen as the substituent attached to another group.

As used herein, the term "optionally substituted" means that the referenced group may be substituted or unsubstituted. In one embodiment, the referenced group is optionally substituted with zero substituents, i.e., the referenced group is unsubstituted. In another embodiment, the referenced group is optionally substituted with one or more additional group(s) individually and independently selected from groups described herein.

Compounds

Borolone-Containing Therapeutics

In an aspect, provided herein is a compound of Formula I:

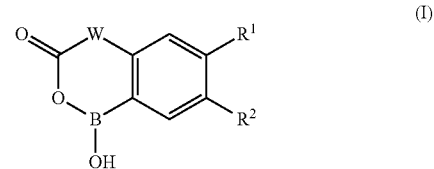

(I)

or a pharmaceutically acceptable salt thereof;

wherein

B is boron;

W is absent or $C(R^3)_2$;

$R^1$ is selected from the group consisting of H, halo, —$NH_2$, $NH(C_1$-$C_6$ alkyl), $N(C_1$-$C_6$ alkyl)$_2$, —OH, —SH, $C_1$-$C_6$ alkyl, $C_1$-$C_6$ alkoxy, —$SO_3H$, and —$SO_2NH_2$;

$R^2$ is selected from the group consisting of H, halo, —$NH_2$, $NH(C_1$-$C_6$ alkyl), $N(C_1$-$C_6$ alkyl)$_2$, —OH, —SH, $C_1$-$C_6$ alkyl, $C_1$-$C_6$ alkoxy, —$SO_3H$, and —$SO_2NH_2$; and $R^3$ is independently, at each occurrence, selected from the group consisting of H, halo, $C_1$-$C_6$ alkyl, $C_1$-$C_6$ alkoxy, $C_6$-$C_{10}$ aryl, $C_5$-$C_{10}$ heteroaryl, $C_3$-$C_{10}$ cycloalkyl, and $C_3$-$C_{10}$ heterocycloalkyl.

In an embodiment, W is absent. In another embodiment, $R^1$ is halo. In yet another embodiment, $R^2$ is —$NH_2$, OH, —SH, —$SO_3H$, and —$SO_2NH_2$.

In still another embodiment, the compound of Formula I is a compound of Formula Ia:

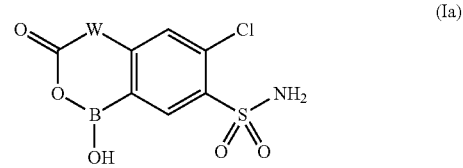

(Ia)

or a pharmaceutically acceptable salt thereof.

In another aspect, provided herein is a compound of Formula II:

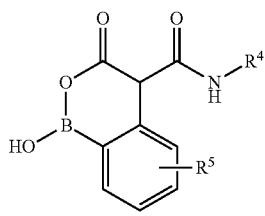
(II)

or a pharmaceutically acceptable salt thereof;
wherein
B is boron;
$R^4$ is selected from the group consisting of $C_6$-$C_{10}$ aryl, $C_5$-$C_{10}$ heteroaryl, $C_3$-$C_{10}$ cycloalkyl, and $C_3$-$C_{10}$ heterocycloalkyl, wherein $C_5$-$C_{10}$ heteroaryl is optionally substituted with methyl; and
$R^5$ is selected from the group consisting of H, halo, —$NH_2$, $NH(C_1$-$C_6$ alkyl), $N(C_1$-$C_6$ alkyl)$_2$, —OH, —SH, $C_1$-$C_6$ alkyl, $C_1$-$C_6$ alkoxy, —$SO_3H$, and —$SO_2NH_2$.

In an embodiment, $R^4$ is selected from the group consisting of pyridine, thiazole, and isoxazole, wherein pyridine, thiazole, and isoxazole are optionally substituted with methyl. In another embodiment, $R^4$ is pyridine. In yet another embodiment, $R^4$ is thiazole substituted with methyl. In still another embodiment, $R^4$ is isoxazole substituted with methyl. In another embodiment, $R^5$ is H.

In yet another embodiment, the compound of Formula II is a compound of Formula IIa, Formula IIb, or Formula IIc:

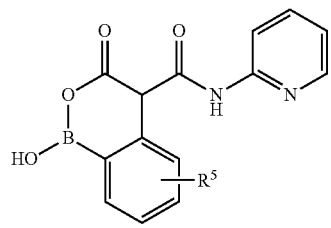
(IIa)

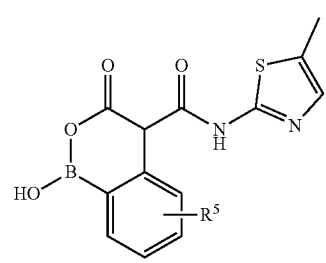
(IIb)

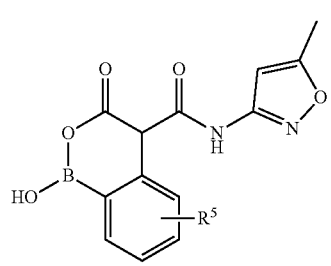
(IIc)

or a pharmaceutically acceptable salt thereof.

In yet another aspect, provided herein is a compound of Formula III:

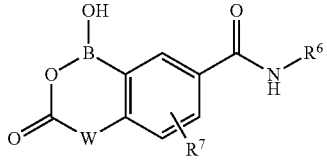
(III)

or a pharmaceutically acceptable salt thereof;
wherein
B is boron;
W is absent or $C(R^8)_2$;
$R^6$ is selected from the group consisting of $C_6$-$C_{10}$ aryl, $C_5$-$C_{10}$ heteroaryl, $C_3$-$C_{10}$ cycloalkyl, and $C_3$-$C_{10}$ heterocycloalkyl, wherein $C_5$-$C_{10}$ heteroaryl is optionally substituted with methyl;
$R^7$ is selected from the group consisting of H, halo, —$NH_2$, $NH(C_1$-$C_6$ alkyl), $N(C_1$-$C_6$ alkyl)$_2$, —OH, —SH, $C_1$-$C_6$ alkyl, $C_1$-$C_6$ alkoxy, —$SO_3H$, and —$SO_2NH_2$; and
$R^8$ is independently, at each occurrence, selected from the group consisting of H, halo, $C_1$-$C_6$ alkyl, $C_1$-$C_6$ alkoxy, $C_6$-$C_{10}$ aryl, $C_5$-$C_{10}$ heteroaryl, $C_3$-$C_{10}$ cycloalkyl, and $C_3$-$C_{10}$ heterocycloalkyl.

In an embodiment, $R^6$ is selected from the group consisting of pyridine, thiazole, and isoxazole, wherein pyridine, thiazole, and isoxazole are optionally substituted with methyl. In another embodiment, $R^7$ is H. In another embodiment, $R^6$ is pyridine. In yet another embodiment, $R^6$ is thiazole substituted with methyl. In still another embodiment, $R^6$ is isoxazole substituted with methyl.

In yet another embodiment, the compound of Formula III is a compound of Formula IIIa, Formula IIIb, or Formula IIIc:

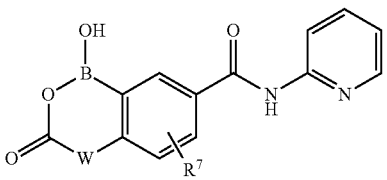
(IIIa)

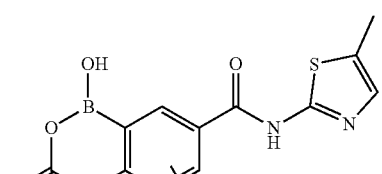
(IIIb)

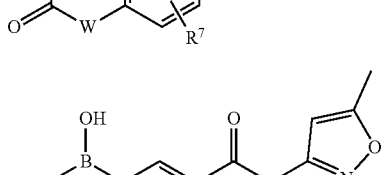
(IIIc)

or a pharmaceutically acceptable salt thereof.

In still another aspect, provided herein is a compound of Formula IV:

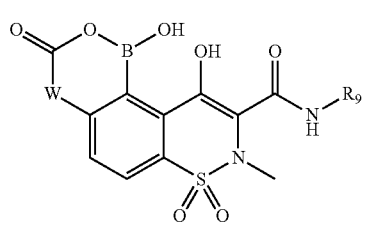

(IV)

or a pharmaceutically acceptable salt or tautomer thereof; wherein
B is boron;
W is absent or $C(R^{10})_2$;
$R^9$ is selected from the group consisting of $C_6$-$C_{10}$ aryl, $C_5$-$C_{10}$ heteroaryl, $C_3$-$C_{10}$ cycloalkyl, and $C_3$-$C_{10}$ heterocycloalkyl, wherein $C_5$-$C_{10}$ heteroaryl is optionally substituted with methyl; and
$R^{10}$ is independently, at each occurrence, selected from the group consisting of H, halo, $C_1$-$C_6$ alkyl, $C_1$-$C_6$ alkoxy, $C_6$-$C_{10}$ aryl, $C_5$-$C_{10}$ heteroaryl, $C_3$-$C_{10}$ cycloalkyl, and $C_3$-$C_{10}$ heterocycloalkyl.

In an embodiment, $R^9$ is selected from the group consisting of pyridine, thiazole, and isoxazole, wherein pyridine, thiazole, and isoxazole are optionally substituted with methyl. In another embodiment, $R^9$ is pyridine. In yet another embodiment, $R^9$ is thiazole substituted with methyl. In still another embodiment, $R^9$ is isoxazole substituted with methyl.

In an embodiment, the compound of Formula IV is a compound of Formula IVa, Formula IVb, or Formula IVc:

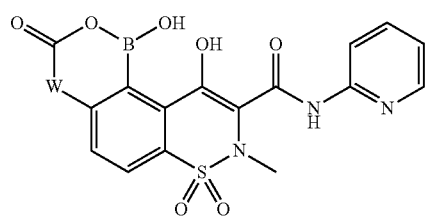

(VIa)

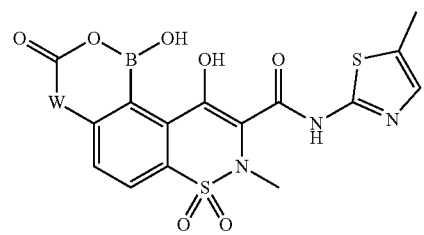

(IVb)

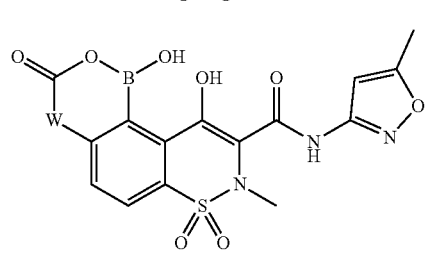

(IVc)

or a pharmaceutically acceptable salt thereof.

In an aspect, provided herein is a compound of Formula V:

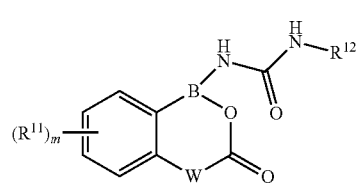

(V)

or a pharmaceutically acceptable salt thereof;
wherein
B is boron;
W is absent or $C(R^{13})_2$;
$R^{11}$ is selected from the group consisting of H, halo, $C_1$-$C_6$ alkyl, —NH$_2$, C(O)CH$_3$, and $C_6$ alkyl-$R^{14}$;
$R^{12}$ is selected from the group consisting of $C_1$-$C_6$ alkyl, $C_6$-$C_{10}$ cycloalkyl, and $C_5$-$C_8$ heterocycloalkyl, wherein $C_6$-$C_{10}$ cycloalkyl is optionally substituted with methyl or —OH;
$R^{13}$ is independently, at each occurrence, selected from the group consisting of H, halo, $C_1$-$C_6$ alkyl, $C_1$-$C_6$ alkoxy, $C_6$-$C_{10}$ aryl, $C_5$-$C_{10}$ heteroaryl, $C_3$-$C_{10}$ cycloalkyl, and $C_3$-$C_{10}$ heterocycloalkyl; and
$R^{14}$ is selected from the group consisting of

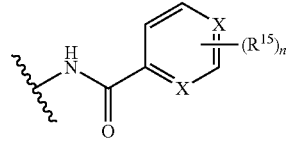

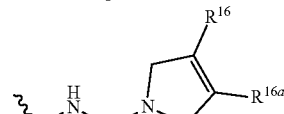

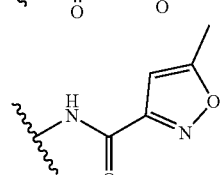

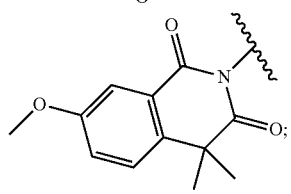

X is independently, at each occurrence, N, CH, or $CR^{19}$;
$R^{15}$ is independently, at each occurrence, selected from the group consisting of halo, $C_4$ alkyl, and $C_1$-$C_4$ alkoxy;
$R^{19}$ is independently, at each occurrence, selected from the group consisting of halo, $C_4$ alkyl, and $C_1$-$C_4$ alkoxy;
$R^{16}$ and $R^{16a}$ are each, independently, $C_1$-$C_4$ alkyl;
m is 0, 1, or 2; and
n is 0, 1, or 2.

In an embodiment, W is absent. In another embodiment, W is C(R$^{13}$)$_2$. In yet another embodiment, R$^{11}$ is halo. In another embodiment, R$^{11}$ is methyl. In yet another embodiment, R$^{11}$ is C(O)CH$_3$. In still another embodiment, R$^{11}$ is NH$_2$. In an embodiment, R$^{12}$ is C$_1$-C$_6$ alkyl. In another embodiment, R$^{12}$ is C$_5$-C$_8$ heterocycloalkyl. In yet another embodiment, R$^{12}$ is C$_6$-C$_{10}$ cycloalkyl optionally substituted with methyl or —OH. In still another embodiment, X is N. In an embodiment, X is CH. In another embodiment, X is CR$^{15}$.

In yet another embodiment, the compound of Formula V is selected from the group consisting of:

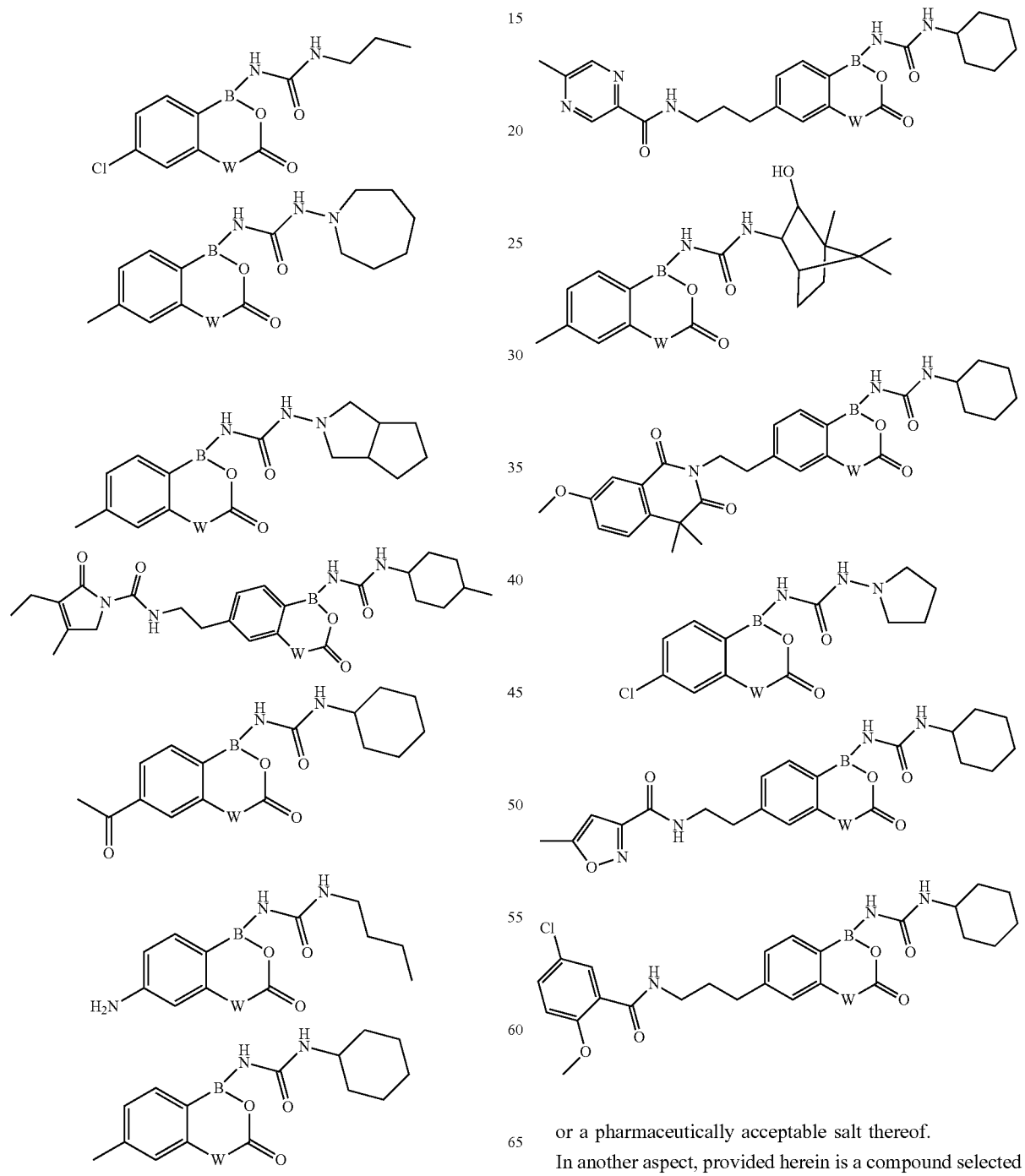

or a pharmaceutically acceptable salt thereof.

In another aspect, provided herein is a compound selected from the group consisting of

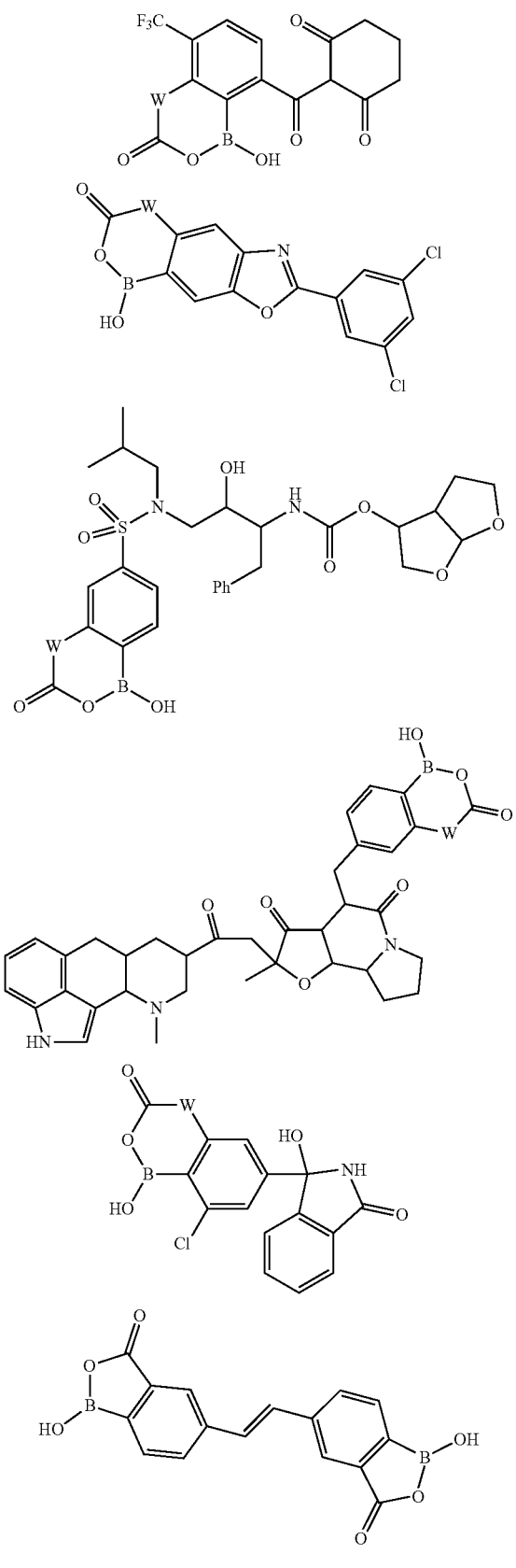

or a pharmaceutically acceptable salt thereof;
wherein
W is absent or C(R$^{17}$)$_2$; and
R$^{17}$ is independently, at each occurrence, selected from the group consisting of H, halo, C$_1$-C$_6$ alkyl, C$_1$-C$_6$ alkoxy, C$_6$-C$_{10}$ aryl, C$_5$-C$_{10}$ heteroaryl, C$_3$-C$_{10}$ cycloalkyl, and C$_3$-C$_{10}$ heterocycloalkyl.

In an embodiment, W is absent. In another embodiment, W is C(R$^{17}$)$_2$. In yet another embodiment, both R$^{17}$ are H.

Benzoxaborolones

In an aspect, provided herein are compounds of Formula VI:

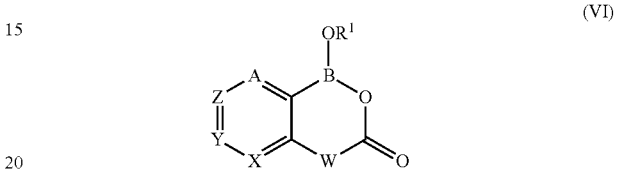

(VI)

or a pharmaceutically acceptable salt thereof;
wherein
B is boron;
O is oxygen;
W is absent or C(R$^2$)$_2$;
X, Y, Z, and A are each, independently, selected from the group consisting of N, CH, and CR$^3$;
R$^1$ is selected from the group consisting of H, C$_1$-C$_6$ alkyl, C$_1$-C$_6$ alkoxy, C$_6$-C$_{10}$ aryl, C$_5$-C$_{10}$ heteroaryl, C$_3$-C$_{10}$ cycloalkyl, and C$_3$-C$_{10}$ heterocycloalkyl;
R$^2$ is, independently at each occurrence, selected from the group consisting of H, halo, C$_1$-C$_6$ alkyl, C$_1$-C$_6$ alkoxy, C$_6$-C$_{10}$ aryl, C$_5$-C$_{10}$ heteroaryl, C$_3$-C$_{10}$ cycloalkyl, and C$_3$-C$_{10}$ heterocycloalkyl; and
R$^3$ is, independently at each occurrence, selected from the group consisting of halo, CN, NO$_2$, NH$_2$, OH, SH, C$_1$-C$_6$ alkyl, C$_1$-C$_6$ alkoxy, C$_6$-C$_{10}$ aryl, C$_5$-C$_{10}$ heteroaryl, C$_3$-C$_{10}$ cycloalkyl, C$_3$-C$_{10}$ heterocycloalkyl, and OC$_6$-C$_{10}$ aryl.

In an embodiment, R$^1$ is H. In another embodiment, W is absent. In yet another embodiment, W is CH$_2$. In still another embodiment, A, Z, Y, and X are CH. In an embodiment, W is absent, X is CH, Y is CH, Z is CH, and A is CH. In another embodiment, W is CH$_2$, X is CH, Y is CH, Z is CH, and A is CH.

In yet another embodiment, the compound of Formula VI is a compound of Formula VII:

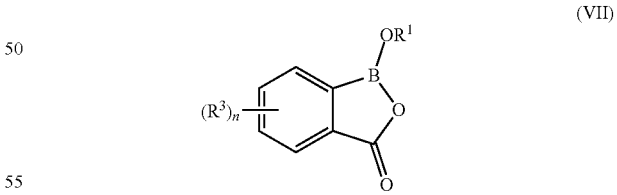

(VII)

or a pharmaceutically acceptable salt thereof
wherein
R$^1$ is selected from the group consisting of H, C$_1$-C$_6$ alkyl, C$_1$-C$_6$ alkoxy, C$_6$-C$_{10}$ aryl, C$_5$-C$_{10}$ heteroaryl, C$_3$-C$_{10}$ cycloalkyl, and C$_3$-C$_{10}$ heterocycloalkyl;
R$^3$ is, independently at each occurrence, selected from the group consisting of halo, CN, NO$_2$, NH$_2$, OH, SH, C$_1$-C$_6$ alkyl, C$_1$-C$_6$ alkoxy, C$_6$-C$_{10}$ aryl, C$_5$-C$_{10}$ heteroaryl, C$_3$-C$_{10}$ cycloalkyl, C$_3$-C$_{10}$ heterocycloalkyl, and OC$_6$-C$_{10}$ aryl; and
n is 0, 1, or 2.

In still another embodiment of Formula VII, $R^1$ is H. In an embodiment of Formula III, n is 0. In another embodiment of Formula VII, $R^3$ is $C_1$-$C_6$ alkyl.

In still another embodiment, the compound of Formula VII is Compound A:

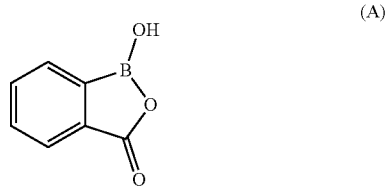 [SMILES: O=C1OB(O)c2ccccc21]

(A)

or a pharmaceutically acceptable salt thereof.

In an embodiment of Formula VI, W is $CH_2$.

In another embodiment, the compound of Formula VI is Compound B:

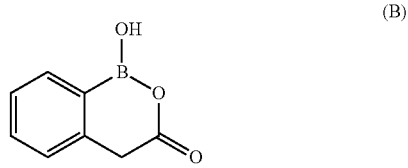 [SMILES: O=C1Cc2ccccc2B(O)O1]

(B)

or a pharmaceutically acceptable salt thereof.

In an aspect, provided herein are pharmaceutical compositions comprising any of the compounds described herein, or a pharmaceutically acceptable salt thereof, together with a pharmaceutically acceptable carrier.

In one embodiment, the disclosed compounds may exist as tautomers. All tautomers are included within the scope of the compounds presented herein.

Compounds described herein also include isotopically-labeled compounds wherein one or more atoms is replaced by an atom having the same atomic number, but an atomic mass or mass number different from the atomic mass or mass number usually found in nature. Examples of isotopes suitable for inclusion in the compounds described herein include and are not limited to $^2H$, $^3H$, $^{11}C$, $^{13}C$, $^{14}C$, $^{36}Cl$, $^{18}F$, $^{123}I$, $^{125}I$, $^{13}N$, $^{15}N$, $^{15}O$, $^{17}O$, $^{18}O$, $^{32}P$, and $^{35}S$. In another embodiment, isotopically-labeled compounds are useful in drug or substrate tissue distribution studies. In another embodiment, substitution with heavier isotopes such as deuterium affords greater metabolic stability (for example, increased in vivo half-life or reduced dosage requirements). In yet another embodiment, the compounds described herein include a $^2H$ (i.e., deuterium) isotope.

In still another embodiment, substitution with positron emitting isotopes, such as $^{11}C$, $^{18}F$, $^{15}O$ and $^{13}N$, is useful in Positron Emission Topography (PET) studies for examining substrate receptor occupancy. Isotopically-labeled compounds are prepared by any suitable method or by processes using an appropriate isotopically-labeled reagent in place of the non-labeled reagent otherwise employed.

In another embodiment, the disclosed compounds could be used to affect the Petasis reaction with carbonyl compounds and amines under physiological conditions. In yet another embodiment, incorporation of the compounds herein onto a tumor-targeting moiety allows for the use of the boron in neutron capture therapy regimens.

The specific compounds described herein, and other compounds encompassed by one or more of the Formulas described herein having different substituents are synthesized using techniques and materials described herein and as described, for example, in Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry 4$^{th}$ Ed., (Wiley 1992); Carey and Sundberg, Advanced Organic Chemistry 4th Ed., Vols. A and B (Plenum 2000, 2001), and Green and Wuts, Protective Groups in Organic Synthesis 3rd Ed., (Wiley 1999) (all of which are incorporated by reference for such disclosure). General methods for the preparation of compounds as described herein are modified by the use of appropriate reagents and conditions, for the introduction of the various moieties found in the Formulas as provided herein.

Compounds described herein are synthesized using any suitable procedures starting from compounds that are available from commercial sources, or are prepared using procedures described herein.

Methods of Treatment

The compounds provided herein can be used in a method of treating a disease or condition in a subject, said method comprising administering to the subject a compound provided herein, or a pharmaceutical composition comprising a compound provided herein.

In an aspect, provided herein is a method of treating an infection in an individual in need thereof, comprising administering to the individual a therapeutically effective amount of a compound disclosed herein.

In an embodiment, the infection is selected from chloronychia, paronychias, erysipeloid, onychorrhexis, gonorrhea, swimming-pool granuloma, larva migrans, leprosy, Orf nodule, milkers' nodules, herpetic whitlow, acute bacterial perionyxis, chronic perionyxis, sporotrichosis, syphilis, tuberculosis verrucosa cutis, tularemia, tungiasis, perk and subungual warts, zona, nail dystrophy (trachyonychia), dermatological diseases, psoriasis, pustular psoriasis, alopecia aerata, parakeratosis pustulosa, contact dermatosis, Reiter's syndrome, psoriasiform acral dermatitis, lichen planus, idiopathy atrophy in the nails, lichin nitidus, lichen striatus, inflammatory linear Verrucous epidermal naevus (ILVEN), alopecia, pemphigus, bullous pemphigoid, acquired epidermolysis bullosa, Darier's disease, pityriasis rubra pilaris, palmoplantar keratoderma, contact eczema, polymorphic erythema, scabies, Bazex syndrome, systemic scleroderma, systemic lupus erythematosus, chronic lupus erythematosus, dermatomyositus, Sporotrichosis, Mycotic keratitis, Extension oculomycosis, Endogenous oculomycosis, Lobomycosis, Mycetoma, Piedra, *Pityriasis versicolor, Tinea corporis, Tinea cruris, Tinea pedis, Tinea barbae, Tinea capitis, Tinea nigra*, Otomycosis, *Tinea favosa*, Chromomycosis, and *Tinea Imbricata*.

In another embodiment, the infection is a fungal infection. In yet another embodiment, the fungal infection is onychomycosis. In still another embodiment, the infection is human immunodeficiency virus (HIV).

In another aspect, provided herein is a method of treating or preventing HIV/AIDS in an individual in need thereof, comprising administering to the individual a therapeutically effective amount of a compound disclosed herein.

In another aspect, provided herein is a method of treating dermatitis in an individual in need thereof, comprising administering to the individual a therapeutically effective amount of a compound disclosed herein. In an embodiment, the dermatitis is eczema.

In yet another aspect, provided herein is a method of treating an inflammatory-related disease in an individual in need thereof, comprising administering to the individual a therapeutically effective amount of a compound disclosed herein.

In an embodiment, the inflammatory-related disease is selected from the group consisting of arthritis, an inflammatory bowel disease, psoriasis, multiple sclerosis, a neurodegenerative disorder, congestive heart failure, stroke, aortic valve stenosis, kidney failure, lupus, pancreatitis, allergy, atherosclerosis, a metabolic disease, a bone disease, a cardiovascular disease, a chemotherapy/radiation related complication, diabetes type I, diabetes type II, a liver disease, a gastrointestinal disorder, an ophthalmological disease, allergic conjunctivitis, diabetic retinopathy, Sjogren's Syndrome, uveitis, a pulmonary disorder, a renal disease, HIV related cachexia, cerebral malaria, ankylosing spondylitis, leprosy, anemia, and fibromyalgia. In another embodiment, the inflammatory-related disease is diabetes type II. In yet another embodiment, the inflammatory-related disease is multiple sclerosis.

In still another aspect, provided herein is a method of killing and/or preventing the growth of an ectoparasite, comprising contacting the ectoparasite with an effective amount of a compound disclosed herein.

In an embodiment, the ectoparasite is a tick or flea. In another embodiment, the ectoparasite is in or on an animal.

In an aspect, provided herein is a method of killing and/or inhibiting the growth of a protozoa, comprising contacting the protozoa with an effective amount of a compound disclosed herein. In an embodiment, the protozoa are *Trypanosoma congolense*.

In another aspect, provided herein is a method treating or preventing high blood pressure in an individual in need thereof, comprising administering to the individual a therapeutically effective amount of a compound disclosed herein.

In an embodiment, the method comprises treating high blood pressure in the individual in need thereof. In another embodiment, the method further comprises treating edema associated with high blood pressure. In yet another embodiment, the method comprises preventing high blood pressure in the individual in need thereof.

In another aspect, provided herein is a method of treating cancer in an individual in need thereof, comprising administering to the individual a therapeutically effective amount of a compound disclosed herein.

In an embodiment, the cancer is selected from the group consisting of lung cancer, colon and rectal cancer, breast cancer, prostate cancer, liver cancer, pancreatic cancer, brain cancer, kidney cancer, ovarian cancer, stomach cancer, skin cancer, bone cancer, gastric cancer, breast cancer, glioma, glioblastoma, neuroblastoma, hepatocellular carcinoma, papillary renal carcinoma, head and neck squamous cell carcinoma, leukemia, lymphomas, myelomas, retinoblastoma, cervical cancer, melanoma and/or skin cancer, bladder cancer, uterine cancer, testicular cancer, esophageal cancer, and solid tumors. In some embodiments, the cancer is lung cancer, colon cancer, breast cancer, neuroblastoma, leukemia, or lymphomas. In other embodiments, the cancer is lung cancer, colon cancer, breast cancer, neuroblastoma, leukemia, or lymphoma. In a further embodiment, the cancer is non-small cell lung cancer (NSCLC) or small cell lung cancer.

In yet another aspect, provided herein is a method of inhibiting an enzyme in an individual in need thereof, comprising administering to the individual a therapeutically effective amount of a compound disclosed herein. In an embodiment, the enzyme is selected from the group consisting of HIV-1 protease, ribonuclease A, pig liver esterase, and calf intestinal phosphatase. In another embodiment, the enzyme is HIV-1 protease. In yet another embodiment, the enzyme is ribonuclease A. In another embodiment, the enzyme is selected from the group consisting of HIV-1 protease, ribonuclease A, and cyclooxygenase.

In another aspect, provided herein is a method of preventing aggregation of a protein in an individual in need thereof, comprising administering to the individual a therapeutically effective amount of a compound disclosed herein.

In an embodiment, the protein is transthyretin (TTR). In another embodiment, the method comprises stabilizing the protein homotetramer. In yet another embodiment, the compound disclosed herein binds to the thyroxin-binding site. In still another embodiment, the method of preventing aggregation of a protein results in the treatment or prevention of amyloidosis in the individual in need thereof.

In an embodiment of the methods, the individual is human.

Administration/Dosage/Formulations

In an aspect, provided herein is a pharmaceutical composition comprising at least one compound provided herein, together with a pharmaceutically acceptable carrier.

Actual dosage levels of the active ingredients in the pharmaceutical compositions provided herein may be varied so as to obtain an amount of the active ingredient that is effective to achieve the desired therapeutic response for a particular patient, composition, and mode of administration, without being toxic to the patient.

In particular, the selected dosage level will depend upon a variety of factors including the activity of the particular compound employed, the time of administration, the rate of excretion of the compound, the duration of the treatment, other drugs, compounds or materials used in combination with the compound, the age, sex, weight, condition, general health and prior medical history of the patient being treated, and like factors well, known in the medical arts.

A medical doctor, e.g., physician or veterinarian, having ordinary skill in the art may readily determine and prescribe the effective amount of the pharmaceutical composition required. For example, the physician or veterinarian could begin administration of the pharmaceutical composition to dose the disclosed compound at levels lower than that required in order to achieve the desired therapeutic effect and gradually increase the dosage until the desired effect is achieved.

In particular embodiments, it is especially advantageous to formulate the compound in dosage unit form for ease of administration and uniformity of dosage. Dosage unit form as used herein refers to physically discrete units suited as unitary dosages for the patients to be treated; each unit containing a predetermined quantity of the disclosed compound calculated to produce the desired therapeutic effect in association with the required pharmaceutical vehicle. The dosage unit forms of the compounds provided herein are dictated by and directly dependent on (a) the unique characteristics of the disclosed compound and the particular therapeutic effect to be achieved, and (b) the limitations inherent in the art of compounding/formulating such a disclosed compound for the treatment of pain, a depressive disorder, or drug addiction in a patient.

In one embodiment, the compounds provided herein are formulated using one or more pharmaceutically acceptable excipients or carriers. In one embodiment, the pharmaceutical compositions provided herein comprise a therapeutically effective amount of a disclosed compound and a pharmaceutically acceptable carrier.

Routes of administration of any of the compositions provided herein include oral, nasal, rectal, intravaginal, parenteral, buccal, sublingual or topical. The compounds provided herein may be formulated for administration by any suitable route, such as for oral or parenteral, for example, transdermal, transmucosal (e.g., sublingual, lingual, (trans)buccal, (trans)urethral, vaginal (e.g., trans- and perivaginally), (intra)nasal and (trans)rectal), intravesical, intrapulmonary, intraduodenal, intragastrical, intrathecal, subcutaneous, intramuscular, intradermal, intra-arterial, intravenous, intrabronchial, inhalation, and topical administration. In one embodiment, the preferred route of administration is oral.

Suitable compositions and dosage forms include, for example, tablets, capsules, caplets, pills, gel caps, troches, dispersions, suspensions, solutions, syrups, granules, beads, transdermal patches, gels, powders, pellets, magmas, lozenges, creams, pastes, plasters, lotions, discs, suppositories, liquid sprays for nasal or oral administration, dry powder or aerosolized formulations for inhalation, compositions and formulations for intravesical administration and the like. It should be understood that the formulations and compositions that would be useful are not limited to the particular formulations and compositions that are described herein.

For oral application, particularly suitable are tablets, dragees, liquids, drops, suppositories, or capsules, caplets and gel caps. The compositions intended for oral use may be prepared according to any method known in the art and such compositions may contain one or more agents selected from the group consisting of inert, non-toxic pharmaceutically excipients that are suitable for the manufacture of tablets. Such excipients include, for example an inert diluent such as lactose; granulating and disintegrating agents such as cornstarch; binding agents such as starch; and lubricating agents such as magnesium stearate. The tablets may be uncoated or they may be coated by known techniques for elegance or to delay the release of the active ingredients. Formulations for oral use may also be presented as hard gelatin capsules wherein the active ingredient is mixed with an inert diluent.

For parenteral administration, the disclosed compounds may be formulated for injection or infusion, for example, intravenous, intramuscular or subcutaneous injection or infusion, or for administration in a bolus dose or continuous infusion. Suspensions, solutions or emulsions in an oily or aqueous vehicle, optionally containing other formulatory agents such as suspending, stabilizing or dispersing agents may be used.

Those skilled in the art will recognize, or be able to ascertain using no more than routine experimentation, numerous equivalents to the specific procedures, embodiments, claims, and examples described herein. Such equivalents were considered to be within the scope of the examples provided herein and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the examples provided herein. Moreover, all values that fall within these ranges, as well as the upper or lower limits of a range of values, are also contemplated by the present application.

The following examples further illustrate aspects of the compounds provided herein. However, they are in no way a limitation of the teachings or disclosure presented herein.

EXAMPLES

The compounds provided herein are further illustrated by the following examples, which should not be construed as further limiting. The methods of preparing and using the compounds provided herein will employ, unless otherwise indicated, conventional techniques of organic synthesis, cell biology, cell culture, molecular biology, transgenic biology, microbiology and immunology, which are within the skill of the art.

Example 1—Synthesis of Compounds of Formula VI

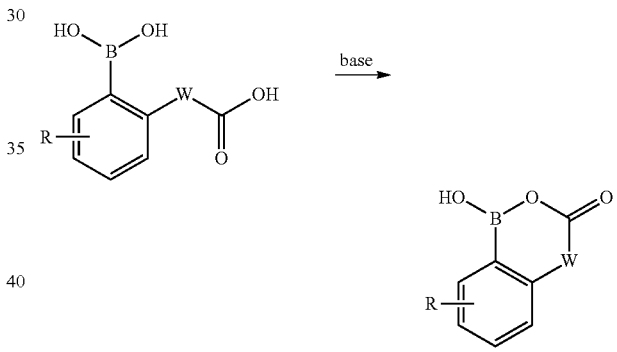

The compounds disclosed herein can be prepared by treating commercially available 2-carboxyphenylboronic acid (wherein W is absent) or 2-(carboxymethyl)-phenylboronic acid (wherein W is $CH_2$) under basic conditions to form the cyclic product, which is prevalent even in aqueous solutions. These compounds can be further functionalized at any position on the phenyl ring with any of the functional groups described above.

Example 2—Substitution of Compounds of Formula VI into Active Agents

Darunavir

The compounds described herein all contain borolone moieties (—B(OH)—O—C(O)—). As shown in the examples below, borolone is significantly more stable to oxidation than the corresponding boronic acid/ester. Therefore, it may be therapeutically advantageous to incorporate the compounds disclosed herein into pharmaceutically active ingredients (APIs, e.g., thiazides, oxicams, sulfonylureas) through substitutions at reactive handles on the APIs.

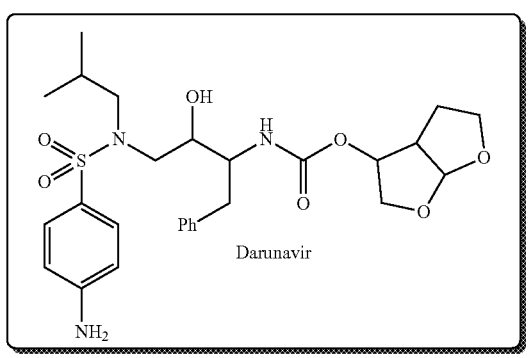

For example, a compound of Formula VI can be incorporated into darunavir, above, by the synthetic route shown in Scheme 1 below. Darunavir is a small molecule, antiretroviral drug used for the treatment and prevention of HIV/AIDS.

Scheme 1.

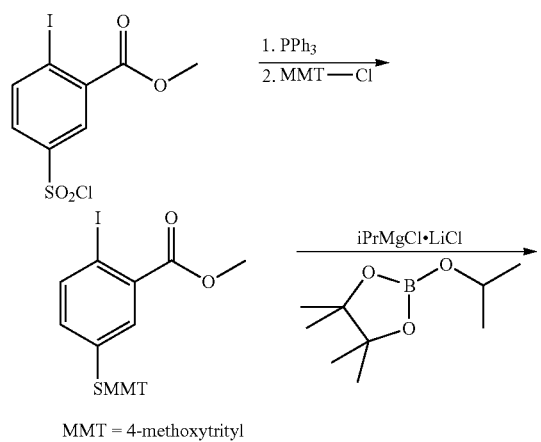

MMT = 4-methoxytrityl

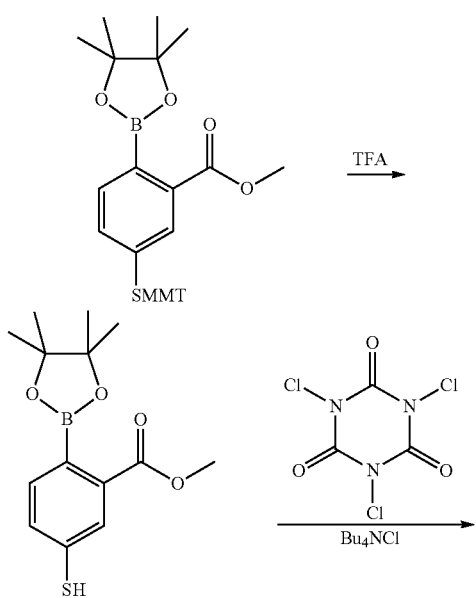

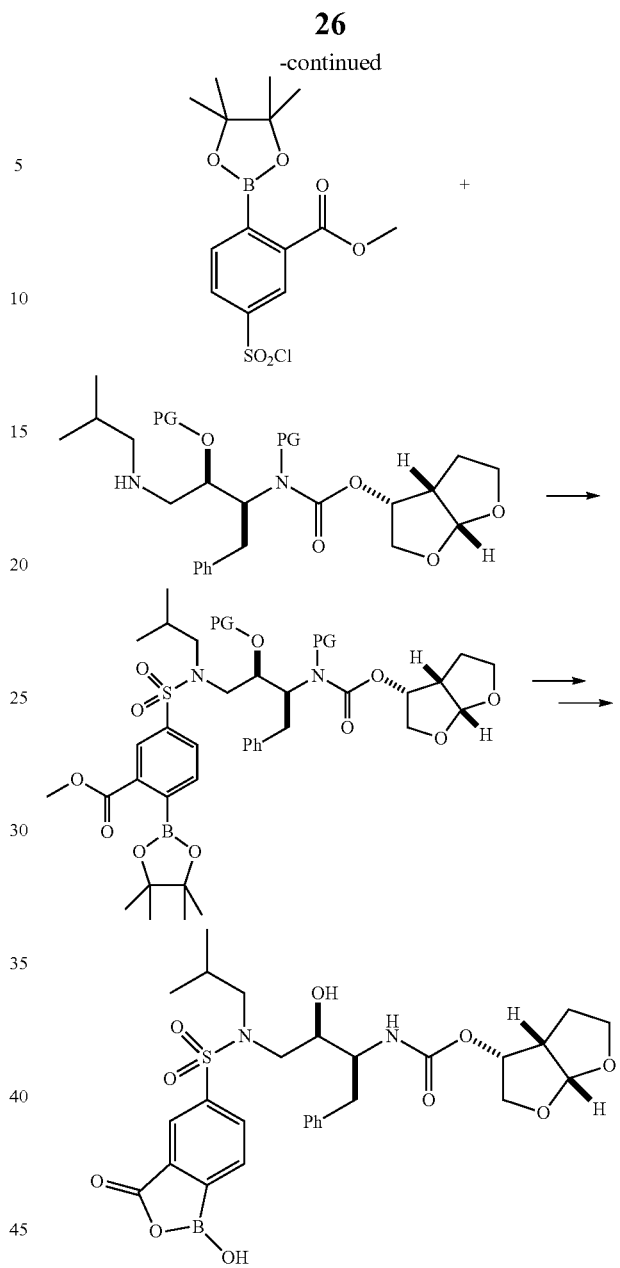

Trans-Stilbene trans-Stilbene was modified with the benzoxaborolone moiety (Formula VI) disclosed herein. A method for preparing the oxaborolone-modified trans-stilbene is shown in Scheme 2 below. Commercially available 2-iodo-5-methylbenzoic acid was esterified under acidic conditions to form the corresponding methyl ester, 2. A modified Wohl-Ziegler bromination results in benzylic bromide 3. Compound 3 undergoes a Sommelet reaction to form aldehyde 1. Advanced intermediates 1 and 3 were combined under Horner-Wadsworth-Emmons reaction conditions to form olefin 4. Formation and in situ quenching of the corresponding Grignard reagent using iPrMgCl allows for installation of pinacol boronic esters in compound 5. Upon treatment with a base and sodium periodate, the methyl ester is hydrolyzed to the corresponding carboxylic acid, and the pinacol boronic esters are cleaved to expose the boronic acids (BOL).

Scheme 2.
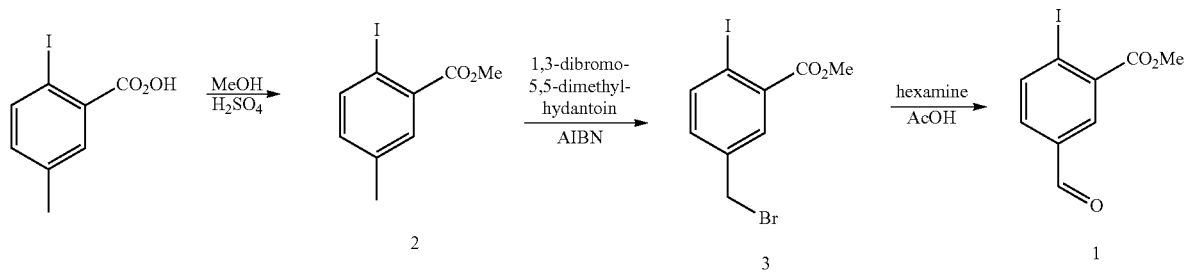
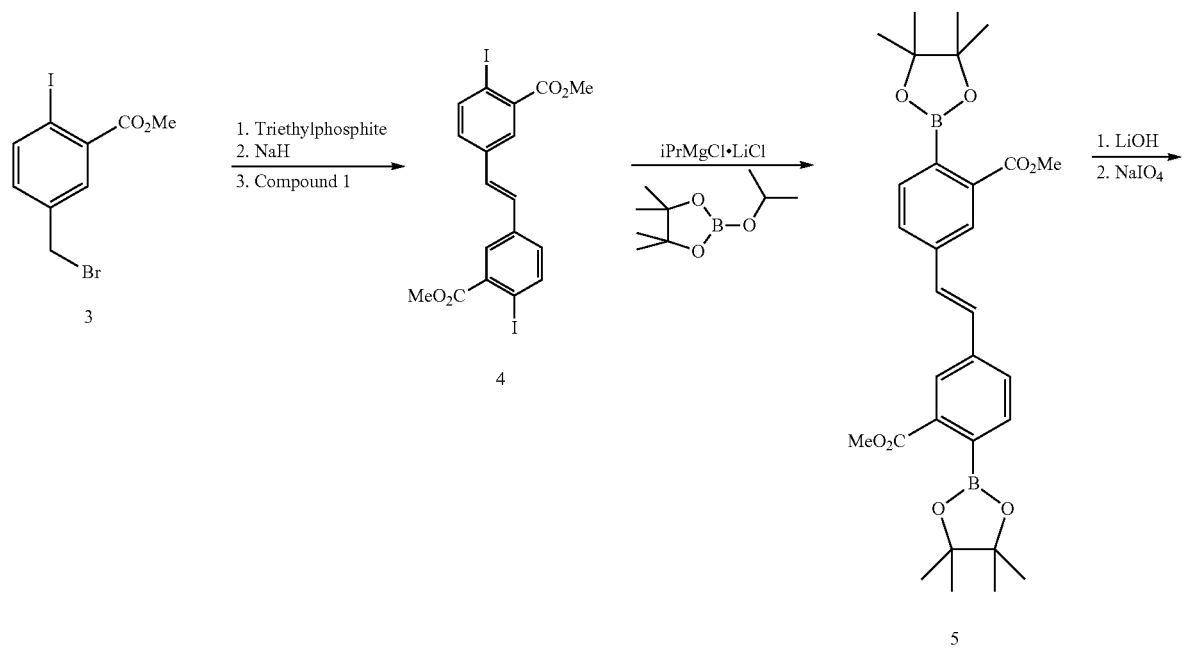
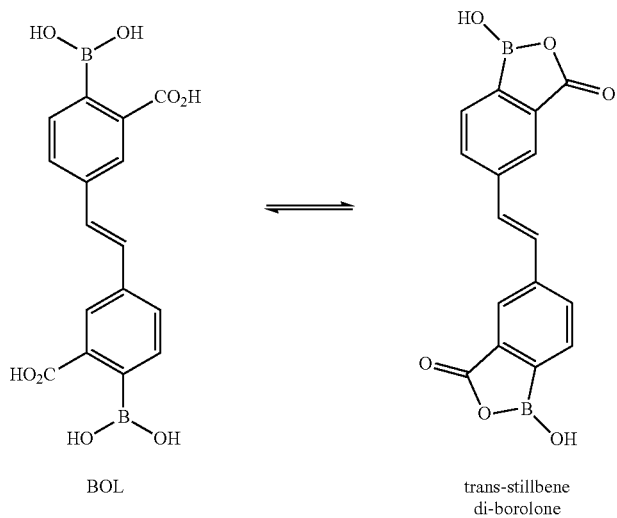

Other moieties useful for installation of the compounds disclosed herein include, but are not limited to:

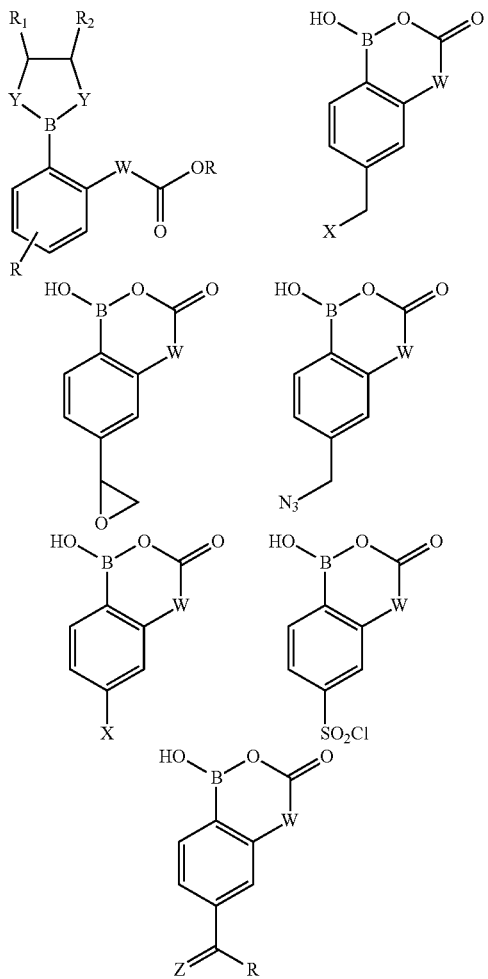

wherein
W is defined above;
X is a leaving group, halide, or pseudohalide;
Z is O or NH; and
a protected boronic acid (e.g., MIDA or DEA) is represented by the formula:

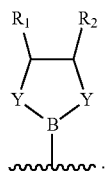

Example 3—Oxidation of Boronic Acids and Biological Thiols

Figure 2:
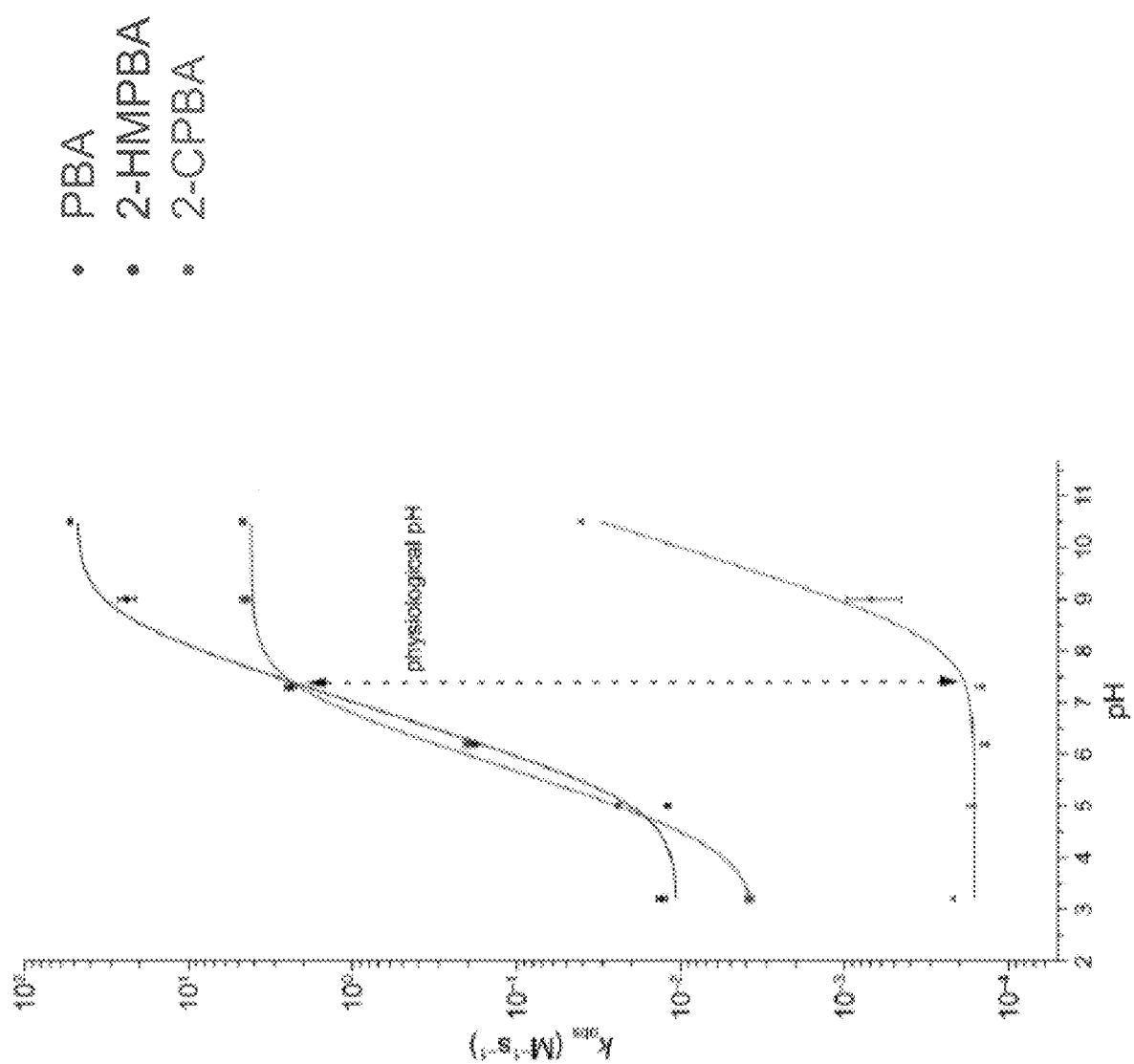
FIG. 2 shows the pH-dependence of the rate constant for oxidation of PBA, 2-HMPBA, and 2-CPBA by hydrogen peroxide.

Hydrogen peroxide is known to be the major reactive oxygen species in humans. The oxidation of phenylboronic acids by aqueous hydrogen peroxide yields a phenol and boric acid. As the phenol product exhibits a significant blue-shift in UV absorbance relative to the boronic acid starting material, a continuous UV-absorbance assay was employed to monitor the oxidation of PBA, 2-HMPBA, and 2-CPBA (FIG. 1). The oxidation rates were first-order with respect to hydrogen peroxide and each boronic acid. The ensuing second-order rate constants varied with pH and were half-maximal for PBA and 2-HMPBA when $pH=pK_a$. Oxidation rates increase in a pH-dependent manner after and before a pH-independent regime (FIG. 2). This observation is consistent with the existence of two pH-independent rate constants, $k_1$ and $k_2$. Whereas the oxidation rates of PBA and 2-HMPBA at physiological pH are similar to those for biological thiols, the comparative stability of CPBA to oxidation is unexpected (Table 1).

The reaction mechanism for boronic acid oxidation is consistent with complexation of peroxide anion to the boron atom, a 1,2-aryl shift to form a borate ester and hydroxide ion, and hydrolysis of the borate ester to form a phenol and borate salt. The nucleophilicity of hydrogen peroxide in water is high. Moreover, the rate constants for oxidation (FIG. 2) are much less than those for complexation of ligands to boronic acids ($k=10^3$-$10^5$ $M^{-1}$ $s^{-1}$). Thus, the complexation of the peroxide is not the rate-determining step in the oxidation reaction.

Figure 3:
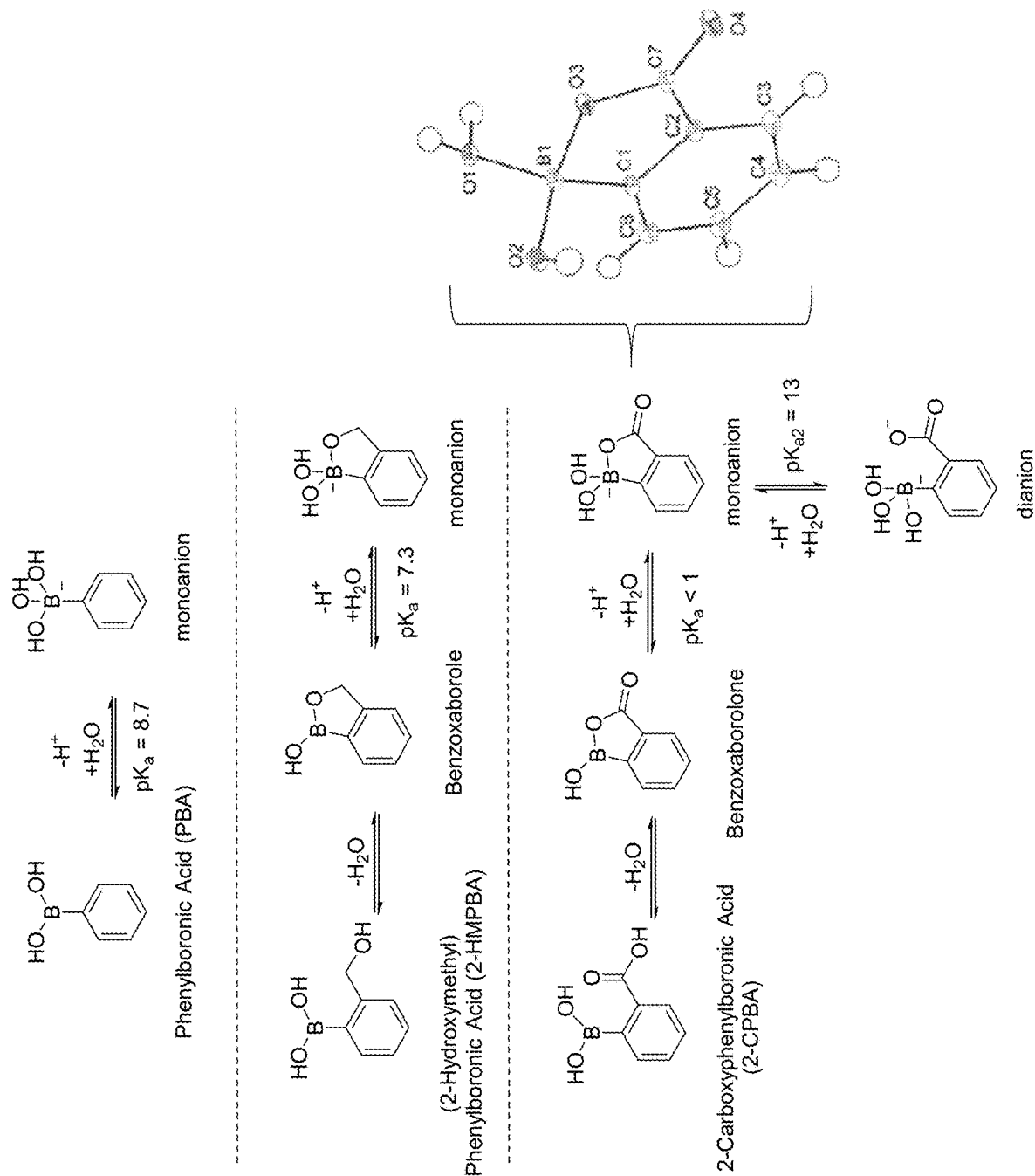
FIG. 3 shows the structures of phenylboronic acid (PBA, top), benzoxaborole (middle), benzoxaborolone (bottom), and hydration and protonation states that are relevant in aqueous solutions. The ORTEP diagram of the protonated monoanion was determined by X-Ray crystallography.

For PBA, 2-HMPBA, and 2-CPBA, the transition from a neutral trigonal state to a monoanionic tetrahedral state occurs when the pH surpasses the $pK_a$ (FIG. 3). Hence, the oxidation rate at $pH>>pK_a$ is largely that of the tetrahedral species. The oxaborolone is differentiated by its existence as a monoanionic tetrahedral species above pH 1. The second-order rate constants for the oxidation for the monoanionic tetrahedral states of PBA, 2-HMPBA, 2-CPBA, and 2-CMPBA ((2-carboxymethyl)-phenylboronic acid) are listed in Table 2. Whereas the borole moiety provides an order-of-magnitude in resistance to oxidation, the oxaborolone surprisingly provides six orders-of-magnitude resistance to oxidation.

TABLE 1

| Compound | $k_{obs}$ ($M^{-1}s^{-1}$) |
| --- | --- |
| PBA | 2.4 |
| 2-HMPBA | 2.4 |
| 2-CPBA | 0.00015 |
| 2-CMPBA | 0.041 |
| Cysteine[a] | 2.9 |
| N-Acetylcysteine[a] | 0.16 |
| Glutathione[a] | 0.89 |

TABLE 2

| | experimental | | computational | |
| --- | --- | --- | --- | --- |
| Compound | $k_{monoanion}$[a] ($M^{-1}s^{-1}$) | $k_{monoanion}$ (rel) | $\Delta\Delta G^{\ddagger}$ (kcal/mol) | k (rel) |
| PBA | 46 | 1 | — | 1 |
| 2-HMPBA | 4.8 | 0.10 | 2.0 | 0.035 |
| 2-CPBA | 0.00016 | 0.0000035 | 8.3 | 0.00000085 |
| 2-CMPBA | 0.041 | 0.00088 | 4.9 | 0.00026 |

Example 4—Inhibition of Catalysis by Ribonuclease A

The catalytic activity of ribonuclease A (RNase A) was assayed using 6-FAM-(dA)rU(dA)$_2$-6-TAMRA as a substrate (Kelemen, B. R.; et al. *Nucleic Acids Res.* 1999, 27, 3696-3701). Assays were performed in 50 mM MES-NaOH buffer, pH 6.0, containing NaCl (100 mM) and RNase A (1 pM) in 200-μL solutions in a black, flat-bottomed 96-well plate and with a Tecan M1000 plate reader. An aqueous solution of 2-CPBA was prepared by dilution from a 500 mM stock that had its pH adjusted to that of the assay buffer. Initial velocities were measured from <5% turnover. Velocities were fitted to the 4-parameter logistic equation using Prism software from GraphPad. Uninhibited velocities were used to constrain the top parameter. The $IC_{50}$ value for inhibition of RNase A by 2-CPBA was 27 mM.

Example 5—Inhibition of Enzymes by 2-CPBA

2-CPBA was tested as an inhibitor of pig liver esterase (PLE). This test used 4-nitrophenyl acetate (PNPA) as a substrate. In addition, 2-CPBA was tested as an inhibitor of calf intestinal phosphatase (CIP). This test used 4-nitrophenyl phosphate. Substrates and PLE (15 units/mg) were obtained from Sigma-Aldrich (St. Louis, MO) as dry powders. CIP was obtained from Promega (Fitchburg, WI) as a solution (1 unit/μL). The hydrolysis of the two chromogenic substrates was monitored with a Tecan M1000 plate reader by measuring the absorbance of the 4-nitrophenol product at a wavelength of 405 nm. Assays were performed in a buffer of 20 mM Tris-HCl buffer, pH 7.5, in a clear, flat bottomed 96-well plate in 200-μL volumes. Solutions for CIP assays contained enzyme (0.003 units/μL) and substrate (1.0 mM). Solutions for PLE assays contained enzyme (0.01 units/mL) and substrate (1.0 mM). Both enzymes were assayed for inhibition by adding 2-CPBA (to a concentration of 0.78-100 mM) from a 250 mM stock solution that had its pH adjusted to that of the assay buffer. Initial velocities were measured by calculating $\Delta A_{405\ nm}$ over time. Velocities were fitted to the 4-parameter logistic equation with Prism software from GraphPad (San Diego, CA). No enzyme and uninhibited velocities were used to constrain the top and bottom parameters. Values of $K_i$ were 80 mM for CIP and 10 mM for PLE.

Example 6—Affinity for Saccharides

PBA and 2-HMPBA are employed often for their ability to form esters with saccharides. As the affinity of boronic acids for saccharides is generally greatest near their $pK_a$ value, the low $pK_{a1}$ of 2-CPBA portends a low affinity. The results of $^1$H-NMR titration experiments with D-fructose, D-glucose, and N-acetylneuraminic acid (Neu5Ac) are consistent with this expectation (Table 3). The loss in affinity of 2-CPBA for saccharides is, however, modest (about 4-fold versus PBA and about 13-fold versus 2-HMPBA) compared to the gain in oxidative stability (see Table 1 above).

TABLE 3

| Compound | D-fructose, $K_a$ (M$^{-1}$) | D-glucose, $K_a$ (M$^{-1}$) | Neu5Ac, $K_a$ (M$^{-1}$) |
|---|---|---|---|
| PBA | 128 ± 20 | 5 ± 1 | 13 ± 1 |
| 2-HMPBA | 336 ± 43 | 28 ± 4 | 43 ± 5 |
| 2-CPBA | 23 ± 2 | 1.7 ± 0.1 | 6.0 ± 0.5 |

Example 7—Deterring Human Transthyretin Aggregation

Transthyretin (TTR) is a homotetrameric protein. Its dissociation into monomers leads to the formation of fibrils that underline human amyloidogenic diseases. The binding of small molecules to the thyroxin-binding sites in TTR stabilizes the homotetramer and attenuates TTR amyloidosis. trans-Stilbene was selected for modification in view of resveratrol, a trans-stilbene natural product having phenyl-3,5-diol and 4-phenol on either end of the double bond. Resveratrol has been employed in other TTR ligands and has been shown to occupy the $T_4$-binding site of TTR.

Tafamidis is a small molecule drug used to treat TTR-related amyloidosis. For the assays investigating the ability of the oxaborolone-modified trans-stilbene analog to prevent TTR fibril formation, Tafamidis was used as a comparator.

TTR was expressed and purified as previously reported (Smith, T. P., et al, *J. Med. Chem.*, 2017, 60, 7820-7834). Inhibition of fibril formation was assayed as previously reported (Smith, et al.). Briefly, TTR (7.2 μM) was incubated with varying ratios of kinetic stabilizers (BOL or tafamidis) in 10 mM sodium phosphate buffer, pH 7.6, containing potassium chloride (100 mM) for 30 min at 37° C. Solutions were 2-fold diluted with 100 mM sodium acetate buffer, pH 4.4, containing potassium chloride (100 mM). Quadruplicate samples were plated in a clear 96-well plate. Fibril formation was assessed by measuring light-scattering at 400 nm immediately following acidification and after a 96-h incubation at 37° C. Data were analyzed with equation 1 below by comparing the change in light-scattering over the incubation with a control containing the protein and no inhibitor. The standard deviation of measurements was propagated through calculation in equation 1. The results of the assays are summarized in Table 4 below.

$$\% \text{ fibril formation} = \frac{A_{400\ nm,ligand,96\ h} - A_{400\ nm,ligand,0\ h}}{A_{400\ nm,control,96\ h} - A_{400\ nm,control,0\ h}} \times 100\% \quad (1)$$

TABLE 4

Inhibition of transthyretin fibril formation.

| Compound | TTR:Compound Ratio | % Fibril formation |
|---|---|---|
| BOL | 1:1 | 92 ± 18 |
| BOL | 1:2 | 64 ± 11 |
| BOL | 1:5 | 43 ± 18 |
| BOL | 1:10 | 24 ± 7 |
| BOL | 1:50 | 1 ± 9 |
| tafamidis | 1:1 | 29 ± 5 |
| tafamidis | 1:2 | 1 ± 5 |

As can be seen in Table 4, the stilbene derivative, BOL, was able to bind to TTR and prevent aggregation when the ratio of BOL:TTR was increased.

The invention claimed is:

1. A compound of Formula Ia:

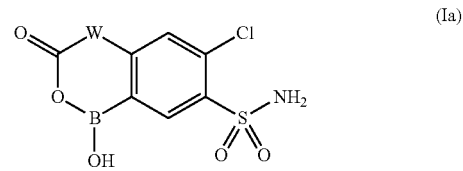

(Ia)

or a pharmaceutically acceptable salt thereof;
wherein
B is boron; and
W is absent or $C(R^3)_2$; and R³ is independently, at each occurrence, selected from the group consisting of H, halo, $C_1$-$C_6$ alkyl, $C_1$-$C_6$ alkoxy, $C_6$-$C_{10}$ aryl, $C_5$-$C_{10}$ heteroaryl, $C_3$-$C_{10}$ cycloalkyl, and $C_3$-$C_{10}$ heterocycloalkyl.

2. The compound of claim 1, wherein W is absent.
3. The compound of claim 1, wherein W is $CH_2$.
4. The compound of claim 1, wherein W is $C(R^3)_2$.

* * * * *